(12) United States Patent
Sawabe et al.

(10) Patent No.: US 9,475,128 B2
(45) Date of Patent: Oct. 25, 2016

(54) DRILL AND METHOD FOR FORMING HOLE

(71) Applicants: Teruo Sawabe, Miyagi (JP); Koji Saito, Akita (JP); Masaru Kato, Akita (JP)

(72) Inventors: Teruo Sawabe, Miyagi (JP); Koji Saito, Akita (JP); Masaru Kato, Akita (JP)

(73) Assignees: MIYAGITANOI CO., LTD., Katta-gun, Miyagi (JP); AKITA PREFECTURE, Akita-shi, Akita (JP)

( * ) Notice: Subject to any disclaimer, the term of this patent is extended or adjusted under 35 U.S.C. 154(b) by 240 days.

(21) Appl. No.: 14/229,096

(22) Filed: Mar. 28, 2014

(65) Prior Publication Data

US 2014/0212234 A1 Jul. 31, 2014

Related U.S. Application Data

(63) Continuation of application No. PCT/JP2013/080126, filed on Nov. 7, 2013.

(30) Foreign Application Priority Data

Nov. 9, 2012 (JP) .................................. 2012-247210
Sep. 5, 2013 (JP) .................................. 2013-184400

(51) Int. Cl.
 *B23B 51/02* (2006.01)
 *B23B 51/00* (2006.01)
 *B23B 51/06* (2006.01)

(52) U.S. Cl.
 CPC ........... *B23B 51/0018* (2013.01); *B23B 51/00* (2013.01); *B23B 51/02* (2013.01);
 (Continued)

(58) Field of Classification Search
 CPC .......... B23B 51/0018; B23B 51/0081; B23B 51/009; B23B 51/02; B23B 2251/085; B23B 2251/087; B23B 2251/14; B23B 2251/18; B23B 2251/28; B23B 2251/282; B23B 2251/285; B23B 2251/08; B23B 2251/44; B23B 2226/27; B23B 2226/275; Y10T 408/9097; Y10T 408/9095; Y10T 408/909; Y10T 408/906; Y10T 408/9065; Y10T 408/902
 USPC .......... 408/214, 223–225, 227, 230, 229, 67
 See application file for complete search history.

(56) References Cited

U.S. PATENT DOCUMENTS 1,752,262 A * 3/1930 Muhlhoff ................ B23B 51/00
 144/219
3,147,646 A * 9/1964 Rawcliffe, Jr. ......... B23B 51/02
 408/230

(Continued)

FOREIGN PATENT DOCUMENTS

AT 12005 U1 * 9/2011 ............. B23B 51/02
CN 1733399 A 2/2006

(Continued)

OTHER PUBLICATIONS

Machine translation of JP 2007-075942, printed Apr. 2016.*

(Continued)

*Primary Examiner* — Daniel Howell
(74) *Attorney, Agent, or Firm* — Manabu Kanesaka

(57) ABSTRACT

A drill capable of performing high-quality drilling machining on a material which is hard to be cut such as CFRP is provided. The drill includes a drill body 4 having a shank portion 2 at a rear side of the drill main body and a cutting portion 3 at a front side of the drill main body, a first land A to a fourth land D at the cutting portion 3, a first cutting portion groove 5a to a fourth cutting portion groove 5d provided between the lands of the first land A to the fourth land D, a pilot blade 6 formed at the tip of the cutting portion 3, a diameter-enlarging spiral thread portion 9 continuously following the pilot blade 6, a finished spiral thread portion 12 continuously following the diameter-enlarging spiral thread portion 9, a diameter-enlarging spiral blade portion 18, and a finishing spiral blade portion 19.

10 Claims, 13 Drawing Sheets

(52) U.S. Cl.
CPC ........ *B23B 51/06* (2013.01); *B23B 2226/275* (2013.01); *B23B 2250/12* (2013.01); *B23B 2251/248* (2013.01); *Y10T 408/03* (2015.01); *Y10T 408/44* (2015.01); *Y10T 408/909* (2015.01); *Y10T 408/90473* (2015.01)

(56) References Cited

U.S. PATENT DOCUMENTS

| | | | | |
|---|---|---|---|---|
| 4,127,355 | A | * | 11/1978 | Oakes ................... B23B 51/009 408/220 |
| 4,536,107 | A | * | 8/1985 | Sandy .................... B27G 15/00 408/214 |
| 5,221,163 | A | | 6/1993 | Nishimura |
| 5,356,245 | A | | 10/1994 | Hosoi et al. |
| 5,378,091 | A | | 1/1995 | Nakamura |
| 5,636,948 | A | * | 6/1997 | Rexius ................... B23B 51/02 407/54 |
| 7,246,976 | B2 | * | 7/2007 | Nordlin ............... B23B 51/0009 408/225 |
| 7,357,606 | B1 | | 4/2008 | Pettit et al. |
| 2012/0003054 | A1 | | 1/2012 | Takagi et al. |
| 2012/0269591 | A1 | | 10/2012 | Shimada |

FOREIGN PATENT DOCUMENTS

| | | | | |
|---|---|---|---|---|
| CN | 101524768 | A | | 9/2009 |
| CN | 201572947 | U | | 9/2010 |
| DE | 716227 | C | * 1/1942 | ............. B23B 51/02 |
| DE | 102009038173 | A1 | | 3/2011 |
| JP | S63-028504 | A | | 2/1988 |
| JP | 2001-054810 | A | | 2/2001 |
| JP | 2007075942 | A | * 3/2007 | |
| JP | 2009-039811 | A | | 2/2009 |
| JP | 2009-172708 | A | | 8/2009 |
| JP | 2009-285821 | A | | 12/2009 |
| WO | 2009/107235 | A1 | | 9/2009 |
| WO | 2011/020859 | A1 | | 2/2011 |

OTHER PUBLICATIONS

PCT/ISA/210, "International Search Report for PCT/JP2013/080126".
Europe Patent Office, Search Report for European Patent Application No. 13843029.3, Jun. 27, 2016.
China Patent Office, Office Action for Chinese Patent Application No. 201380003276.9, Jul. 13, 2016.

* cited by examiner

FIG. 3
SHAPE OF DIAMETER-ENLARGING SPIRAL THREAD
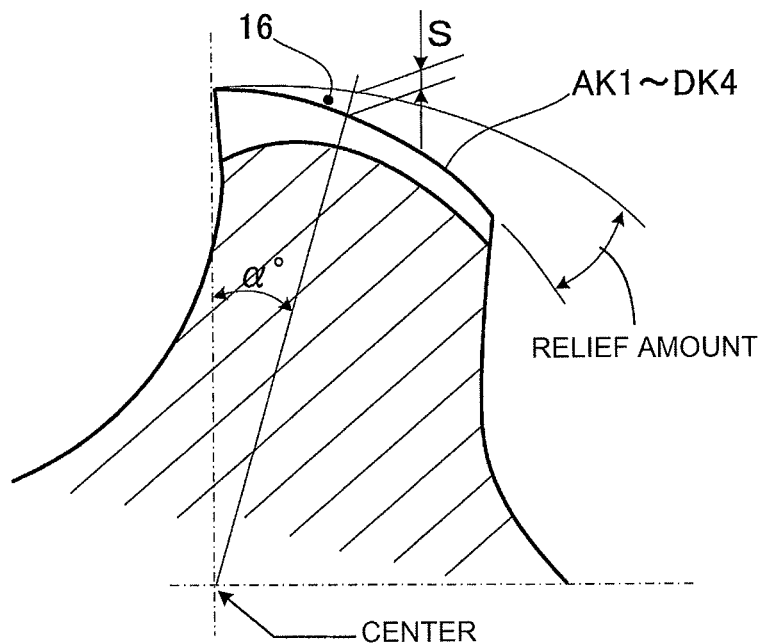
SHAPE OF FINISHING SPIRAL THREAD PORTION
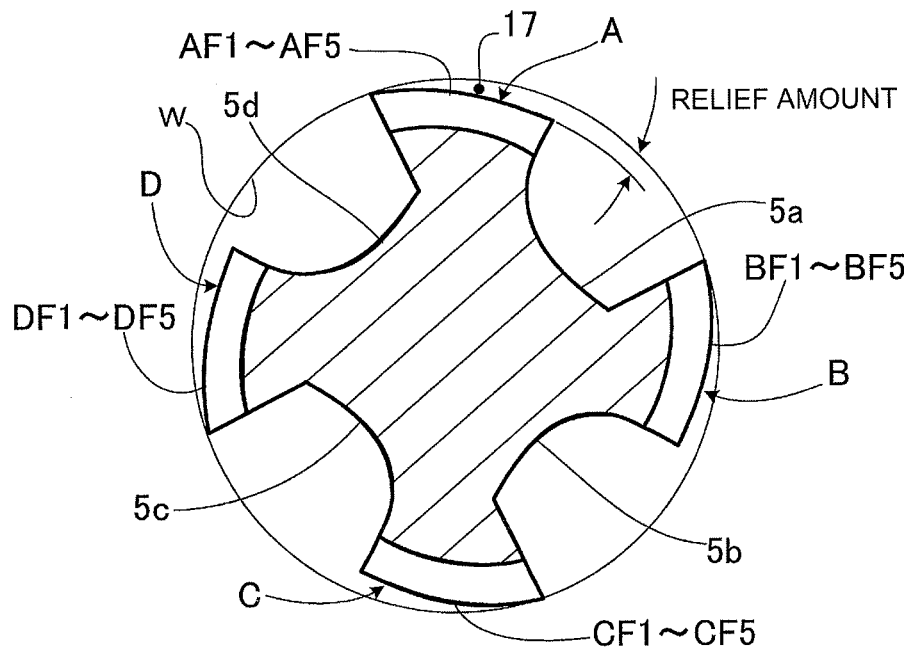

FIG. 4
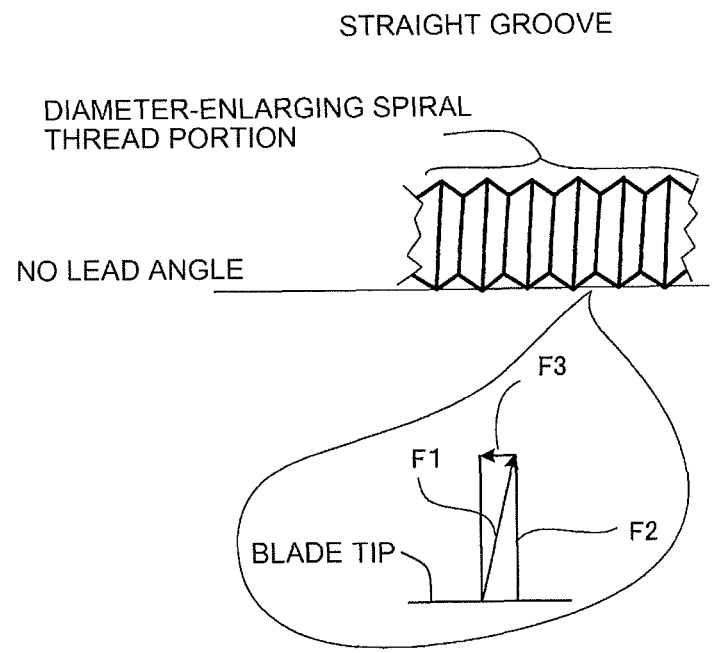
STRAIGHT GROOVE
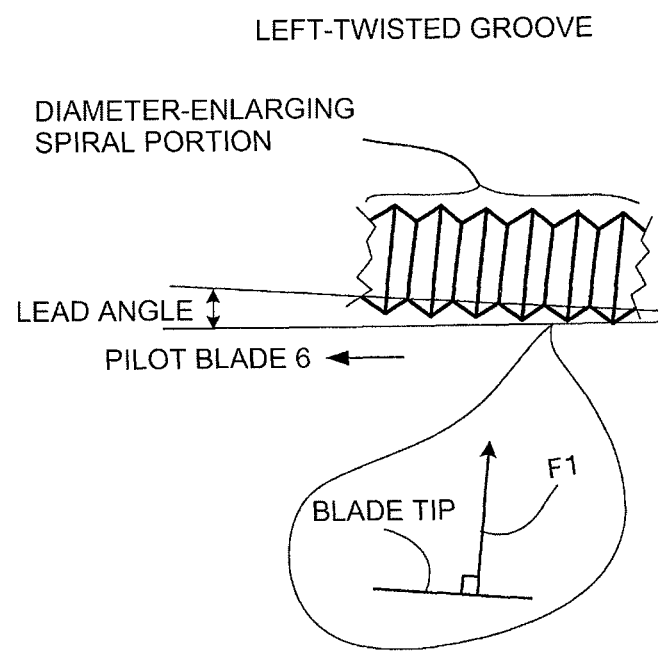
LEFT-TWISTED GROOVE

FIG. 9
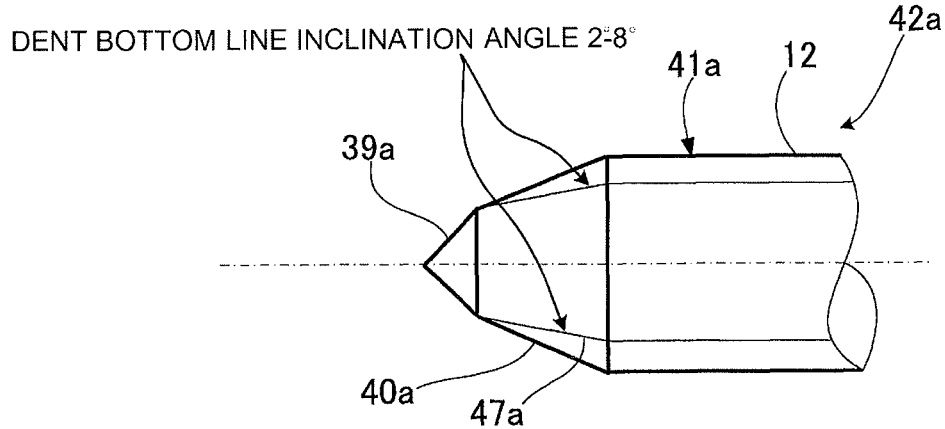
DRILL OF CONFIGURATION 1
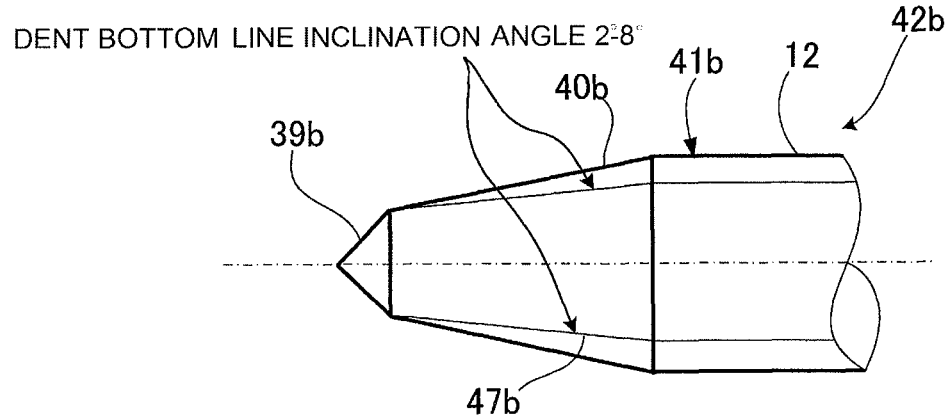
DRILL OF CONFIGURATION 2
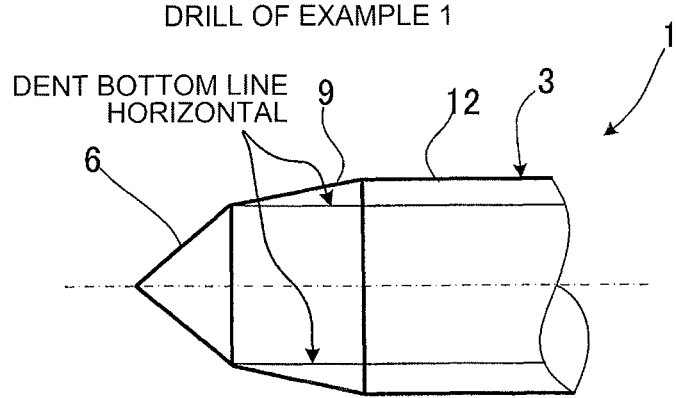
DRILL OF EXAMPLE 1

DRILL AND METHOD FOR FORMING HOLE

RELATED APPLICATIONS

The present application is continuation application of Application No. PCT/JP2013/080126 filed Nov. 7, 2013, and claims priority from Japanese Applications No. JP2012-247210 filed Nov. 19, 2012; and No. 2013-184400 filed on Sep. 5, 2013, the disclosure of which is hereby incorporated by reference herein in its entirety.

TECHNICAL FIELD

The present invention relates to a drilling apparatus suitable for forming a hole on members containing materials such as Fiber Reinforced Plastics (FRP), which are difficult to be machined, and a method for forming the hole. More specifically, such composite materials may include Carbon Fiber Reinforced Plastics (CFRP), Boron Fiber Reinforced Plastics (BFRP), Aramid Fiber Reinforced Plastics (AFRP), and Kevlar Fiber Reinforced Plastics (KFRP) and the like.

BACKGROUND ART

Among these fiber reinforced composite materials (FRP), CFRP is specifically used as a lightweight and high-performance material for use in automobiles, ships, medical equipment, railway vehicles, aviation, space field and the like.

Patent Document 1 discloses a drilling apparatus used for boring (drilling) of these fiber reinforced composite materials.

CITATION LIST

Patent Literature

Patent Document 1: Japanese Patent Application Laid-open Disclosure No. 2009-172708

SUMMARY OF INVENTION

Technical Problem

Although, the cutting and machining of CFRP is difficult, delamination (interlayer peeling), surface peeling, and burrs due to uncut fibers, or damage to resin or fiber are likely to occur. Further, since the fibers are prone to break in the fiber axis radial direction and become fines, further improvement in machining efficiency is a major issue.

That is, since the CFRP is made by hardening fine carbon fibers with epoxy resin and the like, the glass transition temperature (Tg) is low, such as about 250° C. to 350° C. Therefore, if the sharpness of a tool is lowered, there will be an increase in the machining torque (cutting resistance) and cutting temperature. Because of the increase of the cutting temperature, the resin easily becomes soft or viscous (hereafter, called as "softening").

Therefore, resin peeling becomes easier to occur, due to the softening of the resin, and the sharpness of a tip blade is further reduced. As a result, a part of the carbon fiber remains without being cut, and the uncut-long fibers increase. Further, fracture of a member to be machined caused by the uncut-long fibers being caught in a rotating tool and pulled, or fluffing due to the remaining uncut-long fibers occur, and thus the machining quality is significantly reduced.

A drill for forming a hole or a reamer for finishing the hole which is machined by the drill have a margin portion which does not have a relief surface in the outer periphery of a blade portion. Therefore, since a cutting operation is performed in a condition with the whole margin portion being in contact with a member to be machined, the heat generated by the friction becomes large, and thus the abrasion of the blade tip extends to the entire blade. Therefore, if the blade tip is worn out, the machining torque increases and a part of the torque becomes a force in the axial direction (thrust direction). This force in the thrust direction becomes a major cause, in the cutting and machining of CFRP and the like, for the occurrence of delamination and the like particularly at an inlet portion and an outlet portion of the hole. However, as there is no delamination and the like in the case of machining a conventional metal material, the force acting in the thrust direction was not treated as a problem in the drilling industry.

Further, there are some cases where a cutting oil cannot be used for cooling or lubricating the blade tip portion (machining point) or for discharging chips in the cutting and machining of CFRP and the like (for example, in aircraft manufacturing or drilling with a manual driver).

In the above-mentioned cases, the cutting and machining process becomes a dry machining. Therefore, there will be degradation of resin because of a rapid temperature rise due to the cutting without supply of the cooling oil. In addition, since the chips generated by drilling contain a large amount of very hard fine powder, the abrasion of the blade tip of a tool goes rapidly and the sharpness of the blade tip will decreased. Accordingly, the occurrence of delamination and the like is promoted. Further, the scattered fine powder has adverse effects on the human body (for example, "pneumoconiosis") or adverse effects on the surrounding machinery (for example, "abrasion of a sliding surface").

In the drilling apparatus described in Patent Document 1, the outermost peripheral blade portion (4c) is laid vertically toward the direction of fibers, such that the cutting function of the fibers can be increased in the outer peripheral side. Further, the drill has a configuration in which the generation of new burrs in machining the outer periphery side of a region to be cut is suppressed, and a wiper effect on the surface of a hole is also obtained. Thus, the surface roughness of the hole, formed by the drilling apparatus of Patent Document 1, is better compared to conventional drills. Also, the discharge of chips is enhanced by providing a groove (8) that divides the margin (7).

However, the drill disclosed in Patent Document 1 has following drawbacks:

(1) Chips are jetted in the state of extremely-fine fine powder and are discharged in large numbers with scattering in the air (refer to FIG. 5 of the present application (conventional drill)). This is because the chips between the margin (7) and the cutting wall are pulverized as in a millstone, and very fine powder is generated. The scattering phenomenon of the fine powder similarly occurs even in the case of a drill having a curved double-blade and a groove provided as a straight groove (as disclosed, for example, in Japanese Patent Application Publication 2010-214478). Since the thrust force at the time of drilling entirely acts on the blade tip, it will be F (machine side thrust force)=f (cutting blade thrust force).

(2) The embodiment 4 of Patent Document 1, as shown in FIG. 4, has a configuration in which a plurality of grooves (8) having a small shallow width and a shape of a small straight groove (nick) are provided only at the margin (7) provided at the tip of a spiral land. To such grooves (8)

having a small straight groove shape, softened resin and hardened fine powder will gradually adhere, and sooner or later, it will lead to a state of clogging. As a result, the drill of Patent Document 1 has a defect in that delamination (this is called as "tear" in the Patent Document 1) will occur on the wall of less than or equal to 1 mm, and thus the finishing of the hole cannot be done with high accuracy.

(3) In drilling of soft materials, such as aluminum die-cast having non-uniformity in their internal composition, the cutting traveling direction of the tip portion of the drill is bent due to the non-uniformity of the material, and the straight traveling ability of the drill is thus decreased. Therefore, forming a cutting hole with high accuracy was difficult.

The present invention has been made in view of the aforementioned problems of the prior art technologies. An object of the present invention is to provide a drilling apparatus which can carryout high-quality and efficient boring machining (drilling machining) for a material made of, for example, CFRP or the like which are hard to be cut or machined, and a method for forming the hole. In this description, the term "hole" is used so as to include both a through-hole and an unpenetrated blind hole.

Solution to Problem

The present invention has a following configuration for achieving the objects of the invention described above.

The drill according to the first embodiment of the present invention includes:

a drill main body having a shank portion at a rear side of the drill main body and a cutting portion at a front side the drill main body;

a group of lands including a first land to an n-th land formed at the cutting portion;

a group of cutting portion grooves including a first cutting portion groove to an n-th cutting portion groove, each of the cutting portion grooves being formed between two adjacent lands from the group of lands;

a pilot blade which is formed at a tip of the cutting portion and forms a pilot cutting hole in a material to be machined;

a diameter-enlarging spiral thread portion having a group of threads of a diameter-enlarging spiral thread which is formed on each of the first land to the n-th land of the group of lands so as to continuously follow the pilot blade, the diameter-enlarging spiral thread gradually forming a spiral convex part while cutting the pilot cutting hole so as to enlarge a diameter of the pilot cutting hole;

a finishing spiral thread portion having a group of threads of a finishing spiral thread which is formed on each of the first land to the n-th land of the group of lands so as to continuously follow the diameter-enlarging spiral thread portion, each of the finishing spiral thread having the same height, and cutting and finishing the spiral convex part so as to have a flat wall surface;

a spiral dent formed between a spiral thread and a spiral thread of the diameter-enlarging spiral thread and the finishing spiral thread in a way that each adjacent cutting portion groove from the group of cutting portion grooves can communicate with each other;

a diameter-enlarging spiral blade portion which is a crest edge of the diameter-enlarging spiral thread formed by the diameter-enlarging spiral thread and a groove surface of each of the first cutting portion groove to the n-th cutting portion groove of the group of cutting portion grooves and has a group of blades of a diameter-enlarging blade, the diameter-enlarging blade performing a segmented diameter-enlarging cutting or a split diameter-enlarging cutting to the pilot cutting hole formed by the pilot blade; and a finishing spiral blade portion which is a crest edge formed by the finishing spiral thread and a groove surface of each of the first cutting portion groove to the n-th cutting portion groove of the group of cutting portion grooves and has a group of blades of a finishing blade, the finishing blade performing a segmented diameter-enlarging cutting or a split diameter-enlarging cutting to a diameter-enlarging cutting hole formed by the diameter-enlarging spiral blade portion.

The "finishing spiral blade portion" includes both of a shape in which the finishing spiral blade portion is formed around some of the finishing spiral thread portion and a shape in which the finishing spiral blade portion is formed around all of the finishing spiral thread portion.

The "land of the first land to the n-th land" and "the first cutting portion groove to the n-th cutting portion groove" include linear shapes, slightly twisted shapes, helical shapes (spiral shapes) in the technical category.

The drill according to the second embodiment of the present invention including all elements in the aforementioned first embodiment, wherein the pilot blade does not have a margin, both of the pilot blade and the diameter-enlarging spiral thread portion do not have a margin, or any of the pilot blade, the diameter-enlarging spiral thread portion, and the finishing spiral thread portion does not have a margin.

The drill according to the third embodiment of the present invention including all elements in any one of the aforementioned two embodiments, further comprising: a side-through groove formed at an outer peripheral of the shank portion, the side-through groove directly communicating with any of the first cutting portion groove to the n-th cutting portion groove of the group of cutting portion grooves, wherein:

the cutting portion groove communicating with the side-through groove is regarded as a communication cutting portion groove, a coolant which is supplied from a chuck device chucking the shank portion is passed through the side-through groove, inflow-guided into the communication cutting portion groove, and supplied to the pilot blade, and the cutting portion groove among the first cutting portion groove to the n-th cutting portion groove of the group of cutting portion grooves which does not communicate with the side-through groove is regarded as a non-communication cutting portion groove; and a cutting portion groove communication concave part formed at a portion where the pilot blade is formed, the cutting portion groove communication concave part allowing the communication cutting portion groove to directly communicate with the non-communication cutting portion groove, wherein the coolant flowing into the communication cutting portion groove passes through the cutting portion groove communication concave part, passes into the non-communication cutting portion groove, and get discharged from an inlet of a cutting hole;

wherein a groove shape of the first cutting portion groove to the n-th cutting portion groove of the group of cutting portion grooves is a straight groove shape or a weak twisted groove shape by which the coolant from the side-through groove is supplied to the pilot blade.

In this embodiment, air, gas except for air, mist, lubricating liquid, lubricating agent, water, grinding oil agent, and/or cutting agent can be used as the coolant.

The drill according to the fourth embodiment of the present invention including all elements in any one of the aforementioned three embodiments: wherein the first cutting portion groove to the n-th cutting portion groove of the group of cutting portion grooves are twisted in a direction where stress is not generated towards a thrust direction in machining by a lead angle of the diameter-enlarging spiral thread portion and the finishing spiral thread portion.

The drill according to the fifth embodiment of the present invention including all elements in any one of the aforementioned four embodiments, wherein a terminal outer diameter of the pilot blade is the same as a tip outer diameter of the diameter-enlarging spiral thread portion.

The drill according to the sixth embodiment of the present invention including all elements in any one of the aforementioned five embodiments, wherein:

P represents a pitch, and a is set at 0.01 mm-0.5 mm, a crest width of a crest of the finishing blade at the position where a desired outer diameter size of the finishing spiral thread portion is obtained is set to P/8+α that is wider than P/8, a sharp-pointed thread to be having the crest width of P/8+α is formed by thread grinding, and the sharp-pointed thread is formed at a position where the desired outer diameter size is obtained by grinding an outer diameter of the pointed thread and where the crest width is P/8+α.

The drill according to the seventh embodiment of the present invention including all elements in any one of the aforementioned first to fifth embodiments, wherein:

a pitch is set as P, and a groove number of the cutting portion groove is set as n; and the crest width of the crest of the finishing blade at the position where a desired outer diameter size of the finishing spiral thread portion is obtained is set to P/n.

The drill according to the eighth embodiment of the present invention including all elements in any one of the aforementioned first to fifth embodiments and seventh embodiment, wherein:

P represents a pitch, α is set to 0.01 mm-0.5 mm, and a groove number of the cutting portion groove is set as n; and the crest width of the crest of the finishing blade at the position where a desired outer diameter size of the finishing spiral thread portion is obtained is set at P/n+α.

The drill according to the ninth embodiment of the present invention including all elements in any one of the aforementioned eight embodiments, wherein a dent bottom of the spiral dent of the diameter-enlarging spiral thread portion is formed linearly with an inclination angle of 2°-8°.

The drill according to the tenth embodiment of the present invention including all elements in any one of the aforementioned nine embodiments, further comprising a flange portion provided directly or through another member to a part of the shank portion where a chuck device is not chucked, wherein a suction cover for suctioning chips discharged from an inlet of a cutting hole is provided or is attachable, the suction cover including:

a work surface contacting opening part contacting with a surface of the material to be machined;

a cylindrical part extending from the work surface contacting opening part;

a suction port for connecting a suction device provided at the cylindrical part; and a shank side passing part provided at a rear side of the cylindrical part, and having a shape in which the shank portion or another member can pass through and the flange part cannot pass through, and wherein by hitting the flange part at an edge of the shank side passing part, a movement to the front side is stopped, and by the work surface contacting opening part contacting with the surface of the material to be machined, a movement to a rear side of the suction cover associated with a cutting feed is enabled.

The method of forming a hole according to the first embodiment of the present invention includes;

a prior cutting step for forming a prior cutting hole in a material to be machined:

a diameter-enlarging cutting step for cutting the prior cutting hole and forming a spiral convex portion: and a finishing cutting step for cutting the spiral convex part and finishing an opening so as to smoothen a wall surface of the opening with a flat wall:

wherein, the opening is formed in the material to be machined by a single drill conducting each of the steps. Here, the term "hole" is used so as to include both a through-hole and an unpenetrated blind hole.

Advantageous Effects of Invention

According the present invention, chips generated by drilling are neatly shaped as a shape of an accumulation mountain around an inlet of a hole (just like the form of an accumulation mountain of an entrance of ants nest) (see FIG. 5). Therefore, fine chips are hardly generated and thus scattering of the fine chips hardly happens.

The reason for that is, since a pilot hole (preceding cutting hole) opened in advance with a pilot blade will be cut so that the pilot hole is segmented and its diameter is enlarged little-by-little, chips become granulated chips keeping their rigid state. It should be noted that the pilot hole is opened with the help of a plurality of diameter-enlarging blades of a diameter-enlarging spiral thread portion of the drill. The granulated chips are smoothly dispersed into a plurality of spiral dents and are then discharged smoothly into the adjacent cutting portion groove. Thereafter, the granulated chips are carried smoothly into an inlet of the cutting hole.

Thereupon, using a drill according to the present invention, in a case where a margin is present, the granulated chips hardly enter the margin, and smoothly flow into the spiral dents and are discharged smoothly to the cutting portion groove. As a result, the granulated cutting chips do not get pulverized (without becoming fine powder), and get slowly discharged from the inlet of the cutting hole while keeping their granule state.

Therefore, since there is an extremely low likelihood that the chips enter between the margin and the cutting hole wall, the contact pressure between the margin and the cutting hole wall does not increase. Therefore, there will be no marked rise in temperature due to the heat generation, or marked acceleration in the abrasion of the cutting blade tip.

When drilling is performed using a drill according to the present invention, as the heat generation is small, and the contact pressure between the drill and the cutting hole wall is low, there will be no occurrence of softening or dissolving and melting, and also delamination does not occur. Therefore, the cutting in a rigid state is carried out throughout the entire cutting process. In addition, because of finishing with the spiral thread portion, cutting for finishing is carried out by a large number of finishing blades. As a result, despite materials such as FRP and the like which are difficult to be machined, it becomes possible to machine a cutting hole with high quality in which delamination (interlayer peeling), surface peeling, burrs due to uncut fibers, or damage to resin or fiber are low.

Further, as the cutting operation of the diameter-enlarging spiral thread portion is a biting cutting operation, the straight travel property is ensured by the diameter-enlarging spiral thread portion. Therefore, it becomes possible to provide a drill in which a margin is not provided at a pilot blade, a pilot blade and a diameter-enlarging spiral thread portion or a pilot blade, a diameter-enlarging spiral thread portion and a finishing spiral thread portion. It is understood that, in conventional drills, the margin is an essential composition requirement for the straight travel property. The method for forming a hole according to the present invention can also obtain the similar effects described above.

BRIEF DESCRIPTION OF DRAWINGS

FIG. 3 shows a shape diagram of the diameter-enlarging spiral thread portion and a simplified diagram of the finishing spiral thread portion of Example 1 of the present invention.

FIG. 4 is an explanatory drawing of torsion of Example 1 of the present invention.

FIG. 9 shows conceptual views of the drill of configurations 1 and 2 of Example 3 of the present invention, and a conceptual view of the drill of Example 1 of the present invention.

DESCRIPTION OF EMBODIMENTS

Figure 1:
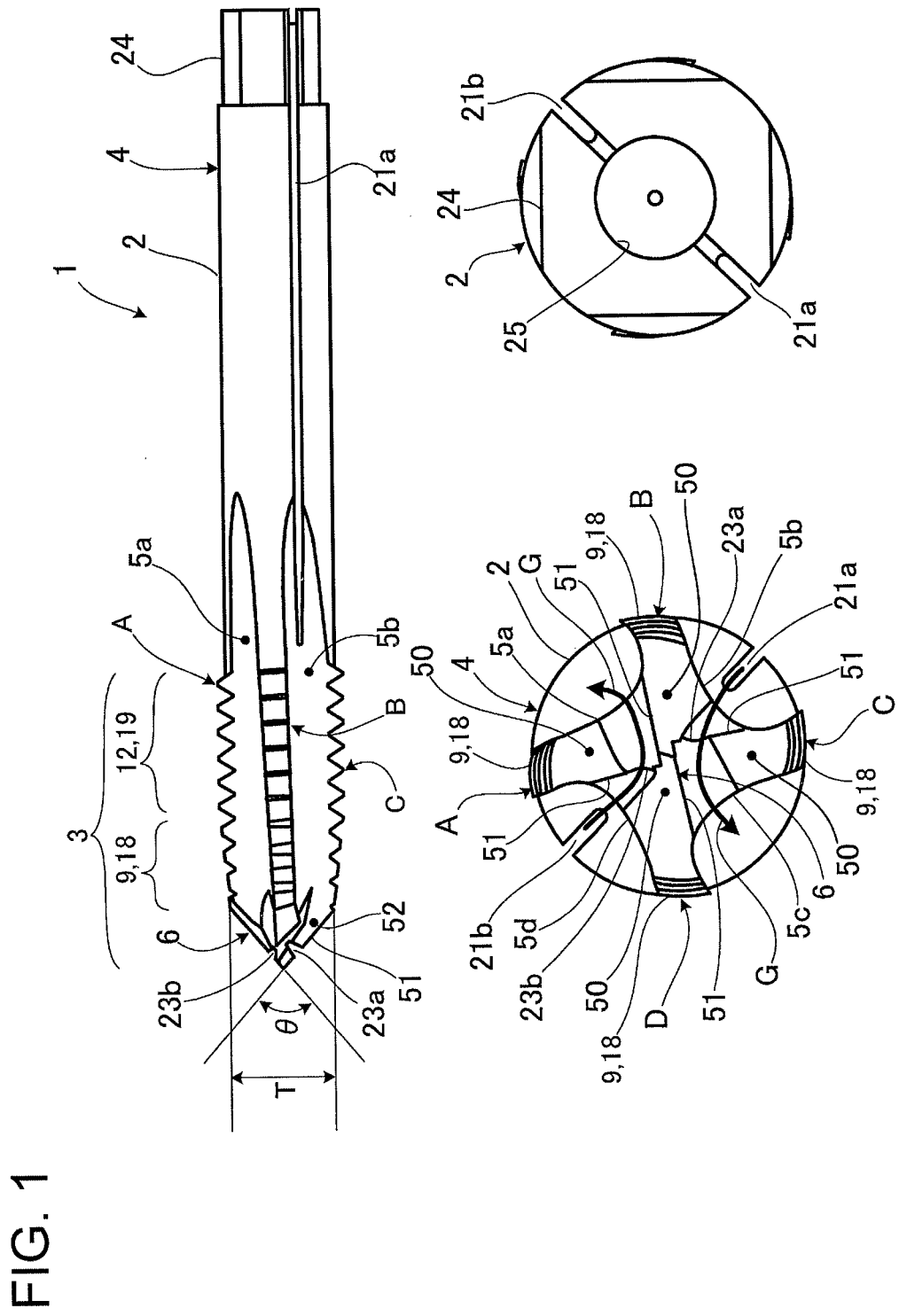
FIG. 1 shows a side view, an enlarged front view (pilot blade side) and an enlarged rear view (shank portion side) of Example 1 of the present invention.

Embodiments for carrying out the present invention will be described below.

The present invention is based on a new way of thinking, and has a structure in which a pilot blade initially cut a pilot cutting hole. A diameter-enlarging spiral thread portion, having a diameter which continuously becomes larger and is formed following the pilot blade, cuts the pilot cutting hole so as to enlarge the diameter of the pilot cutting hole (diameter-enlarging cutting) and form a spiral convex part (hereafter, called "spiral convex part). Then, a finishing spiral thread portion, formed following the diameter-enlarging spiral thread portion, cuts and removes the spiral convex part so as to have a hole having a smooth wall surface. In the present invention, the above-mentioned machining processes are performed with a single drill.

The spiral thread shapes of the diameter-enlarging spiral thread portion and the finishing spiral thread portion (spiral shape, mountain shape, and valley shape) of the drill of the present invention include a variety of spiral thread shapes within its technical scope. Spiral thread shape of Screw standard (for example, JIS standard) is also included in the scope.

In the following, examples as embodiments for carrying out the present invention are described below. However, it is not intended to imply that the present invention is limited only to these examples. Also, in connection with the description of the examples described later, same numerical reference will be added for the same configuration part in the examples described earlier and duplicate description will be omitted.

Example 1

In the first example of the present invention shown in FIG. 1 through FIG. 7, the numeral reference 1 is referring to a drill, which has the following configuration.

The drill 1 includes a drill body 4 which has a shank portion 2 provided at the rear side and a cutting portion 3 provided at the front side.

The cutting portion 3 has a first land A to a fourth land D. Between the first land A to the fourth land D, a first cutting portion groove 5a to a fourth cutting portion groove 5d are provided. The first to the fourth cutting portion grooves 5a-5d are extending in the axial direction of the drill body 4 and are separating the first land A to the fourth land D, respectively.

A finishing spiral thread portion 12 is formed on the lands of the first land A to the fourth land D.

At the tip of the cutting portion 3, a pilot blade 6 having a diameter smaller than the outer peripheral diameter of the finishing spiral thread portion 12 is provided so as to form a pilot cutting hole (performing initial hole) in a material to be machined (S) (hereinafter referred to as "material to be cut" or "material to be bored") by rotary cutting. Diameter-enlarging spiral threads AK1-DK4 are formed being communicated with the pilot blade 6 in which its diameter becomes larger on proportion as going to the rear side. The diameter-enlarging spiral threads AK1-DK4 are divided by the cutting portion grooves 5a-5d and are extending toward the finishing spiral thread portion 12. The diameter-enlarging spiral threads AK1-DK4, while carrying out cutting of the pilot cutting hole so as to enlarge the diameter of the pilot cutting hole by a biting cutting operation, will form a spiral convex part 20. The group of the threads of the diameter-enlarging spiral threads AK1-DK4 will be collectively referred as a diameter-enlarging spiral thread portion 9.

Figure 2:
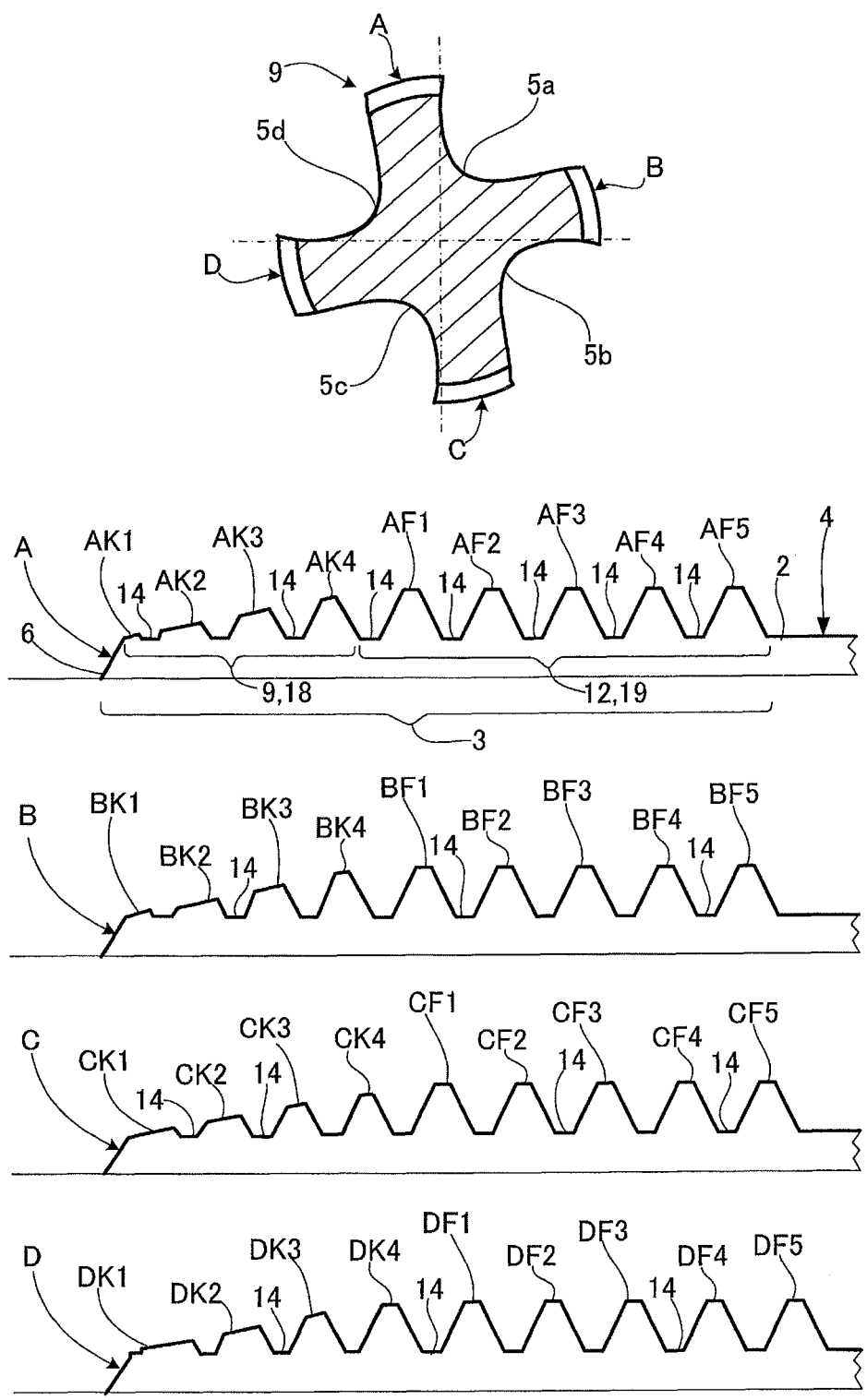
FIG. 2 shows a simplified diagram of the diameter-enlarging spiral thread portion and an exploded view of the cutting portion of Example 1 of the present invention.

The finishing spiral threads AF1-DF5 are provided with following the diameter-enlarging spiral thread portion 9 on the first land A to the fourth land D (see FIG. 2). Each of the finishing spiral threads has the same height and the finishing spiral threads are divided by four numbers of the cutting portion grooves 5a-5d. Also the finishing spiral threads cut and finish the spiral convex part so that it has a flat wall surface. The group of threads of the finishing spiral threads AF1-DF5 will be collectively called as the finishing spiral thread portion 12 described above.

Between each of the adjacent threads in the axial direction of the diameter-enlarging spiral threads AK1-DK4 and the finishing spiral threads AF1-DF5, a spiral dent 14 is provided so as to let the adjacent cutting portion grooves of the first to the fourth cutting groove 5a-5d communicate with each other.

A cutting edge 51 of the pilot blade 6 is formed by the crest edge part of the diameter-enlarging spiral threads AK1-DK4 formed by the intersecting line of the diameter-enlarging spiral threads AK1-DK4 and the groove surface of the first cutting portion groove 5a to the fourth cutting portion groove 5d (a point of intersection of a rake surface 52 of the pilot blade and a relief surface 50 of the pilot blade). (See FIG. 12)

With respect to forming a hole, first, a pilot cutting hole is cut and formed by the pilot blade 6. Then, a diameter-enlarging spiral cutting portion 18 having a blade group of the diameter-enlarging blades of the diameter-enlarging spiral threads AK1-DK4 forms a spiral convex portion with cutting the pilot cutting hole so as to enlarge the diameter of the pilot cutting hole (hereinafter referred to as "diameter-enlarging cutting"). That is, cutting is continued so as to gradually enlarge the hole with a biting cutting operation. A cutting hole formed in this manner will be called as a diameter-enlarged cutting hole.

A finishing spiral blade portion 19 refers to a collective term for a blade group having a plurality of finishing blades formed at the intersection portion of the finishing spiral threads AF1-DF5 and the first cutting portion groove 5a to the fourth cutting portion groove 5d. The finishing blade is formed at the crest edge part of the finishing spiral threads AF1-DF5 (a point of intersection portion of a rake surface and a relief surface). By cutting the diameter-enlarged cutting hole with the finishing spiral blade portion 19, the spiral convex portion is cut off, and thus the diameter-enlarged cutting hole is finished to be a final hole having a smooth wall (hereinafter referred to as "flat wall finish").

The feed rate of the drill at the time of cutting is set to a value so that the spiral convex portion 20 will not be formed on the wall surface of the cutting hole, which is formed in cutting of a material to be machined by a drill, and therefore the wall surface will be finished as a flat wall. The relationship between the feed rate and the finishing spiral blade portion will be explained later.

In this example, although four numbers of cutting portion grooves 5a-5d are provided, the present invention is not limited thereto, and it is also possible to provide two, three, four or more than four cutting portion grooves.

In the outer periphery side of the shank 2, side-through grooves 21a and 21b with a linear shape are formed. The side-through grooves 21a and 21b are directly communicated from the rear end of the shank portion to the second cutting portion groove 5b and the fourth cutting portion groove 5d (hereafter each of these two cutting portion grooves 5b and 5d is referred to as "communication cutting portion groove").

Figure 8:
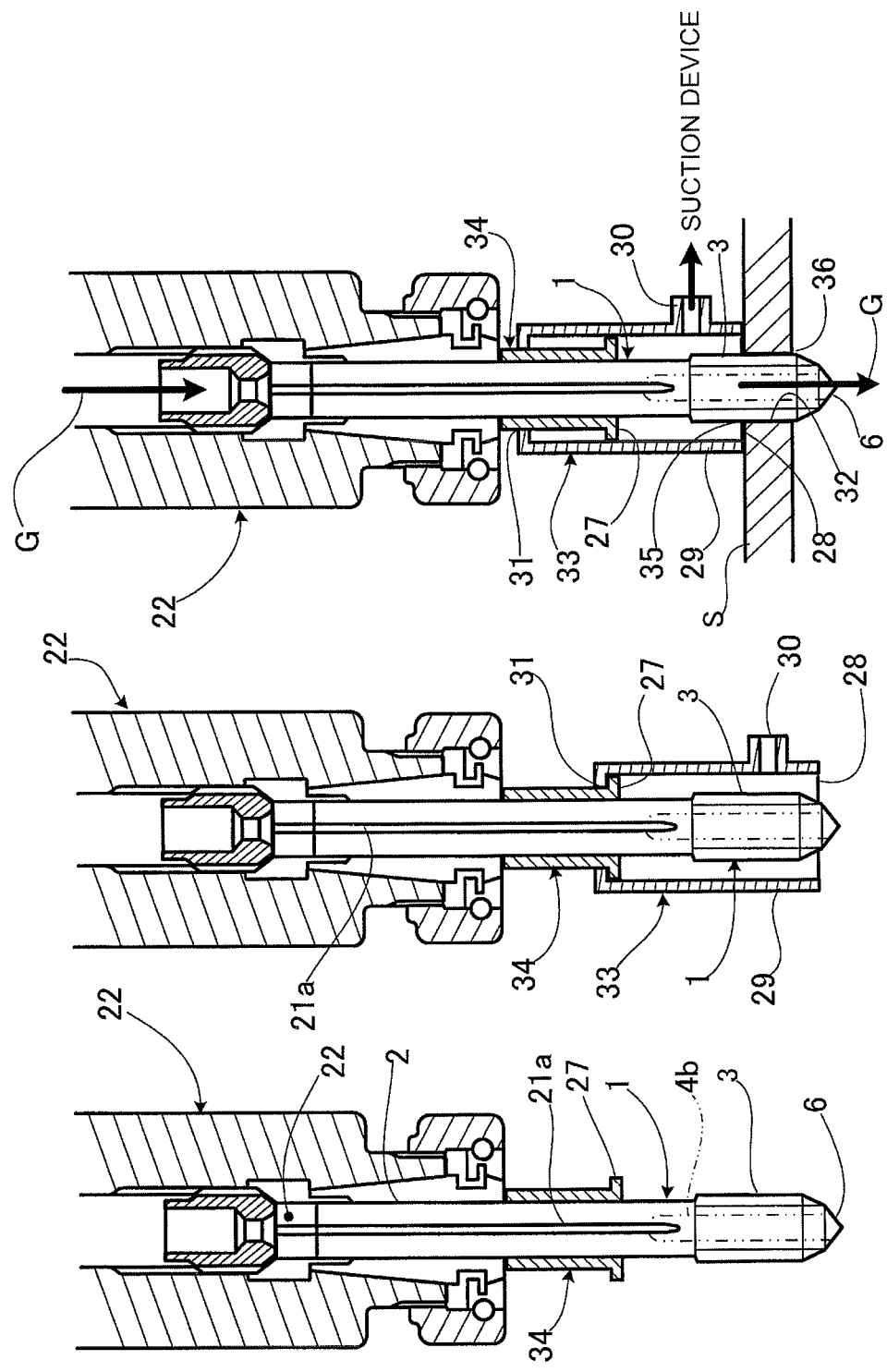
FIG. 8 shows a diagram in a condition when a drill is chucked to a chuck device and a diagram in a condition when the drill is used in Example 2 of the present invention.

Gas G is supplied from a chuck device 22 side which chucks the shank 2 (see FIG. 8). The gas G passes through the side-through grooves 21a and 21b, is inflow-guided into the "communication cutting portion groove," and reaches up to the pilot blade 6. The gas G is used for cooling and discharging chips, the gas G including air for cooling and discharging chips, dry ice gas, nitrogen gas or mixture thereof, each of which are one of the types of coolants.

The first cutting portion groove 5a to the fourth cutting portion groove 5d have a straight groove shape or a weak twisted groove shape (for example, 1 to 5 degree) so that the gas for cooling and discharging chips from the side-through grooves 21a and 21b is supplied substantially linearly to the pilot blade 6.

A cutting portion groove communication concave portion 23a communicates directly to the second cutting portion groove 5b and the third cutting portion groove 5c, and a cutting portion groove communication concave portion 23b communicates directly to the second cutting portion groove 5b and the first cutting portion groove 5a.

In the state when the cutting hole is unpenetrated, the gas G for cooling and discharging chips which flows into the "communication cutting portion groove" passes through the cutting portion groove communication concave portion 23a, 23b, flows into a "non-communication cutting portion groove," and get discharged from an inlet of the cutting hole along with the chips.

As shown in FIG. 4, the first cutting portion groove 5a to the fourth cutting portion groove 5d have a shape in which only the lead angle of the diameter-enlarging spiral thread portion 9 and the finishing spiral thread portion 12 is twisted (a twist range of 1 to 5 degrees) in the direction where stress is not generated towards the thrust direction in machining process (normally left direction).

That is, as shown in the figure at the top of FIG. 4, when the cutting portion groove is a linear groove (straight groove), particularly in the diameter-enlarging spiral blade portion 18, since the stress F3 generated in the drill advancing direction acts obliquely on the blade edge, an unnecessary stress is generated by getting divided into a stress F2 generated in the direction of rotation and a stress F1 in the traveling direction.

However, as shown in the figure at the bottom of FIG. 4, when the first cutting portion groove 5a to the fourth cutting portion groove 5d are left twisted grooves, particularly in the diameter-enlarging spiral blade portion 18, since the stress F3 generated in the drill advancing direction acts perpendicularly on the diameter-enlarging blades (blade edge) of the diameter-enlarging spiral threads AK1-DK4, the stress F2 in the direction of rotation becomes identical to the stress F1 generated in the drill advancing direction. Therefore, the stress F3 towards the thrust direction is not generated.

In order to suppress as much as possible a rise in machining torque due to the cutting resistance or abrasion, the outer diameter size T of the pilot blade 6, which is a drill blade at the tip, is set to be the same as the tip diameter of the diameter-enlarging spiral thread portion 9 and the tip angle θ of the pilot blade 6 is set to be 75 to 120 degrees (90 degrees in the figure).

By letting the terminal outer diameter of the pilot blade 6 be the same as the tip outer diameter of the diameter-enlarging spiral thread portion 9, the initial biting amount of the diameter-enlarging blade into the pilot cutting hole, formed by the pilot blade 6, can be a shallow biting amount, and thus, the cutting resistance can be reduced and the durability can be improved.

Regarding the cutting portion groove communication concave portion, the provided configuration with two cutting portion groove communication concave portions 23a and 23b can achieve the most efficient performance in discharging chips and cooling the tip of the pilot blade 6 as well as the entire cutting blade with the gas for cooling and chip discharging. Therefore, a drill provided with the pilot blade of a quadruple-blade, 4 numbers of lands and 4 numbers of cutting portion grooves may carry the preferred embodiment of this invention.

The coolant is not limited to the gas for cooling and chip discharging, and mist and liquid may also be used. An optimal coolant may be chosen based on machining conditions, the use, the environment, and the productivity and the like of the material to be cut.

Regarding the diameter-enlarging spiral threads of the diameter-enlarging spiral thread portion 9 having a quadruple-blade, although the diameter-enlarging spiral thread with 1.5 threads to 3 threads is appropriate, a diameter-enlarging spiral thread with 2.5 threads, which achieved the most suitable biting result, is used for the drill 1.

The shank 2 is provided with a square part 24 for engaging the shank with a spindle (not shown in the figure) having a different holding mechanism from that of the chuck device 22 (spindle) of a machining center described later (omitted by not showing in the figure) by whirl-stopping at its rear end. A spot facing hole 25 is provided at the end section of the square part 24. By directly connecting the side-through grooves 21a and 21b to this spot facing hole 25, the gas for cooling and chip discharging G that is accumulated in the spot facing hole 25 efficiently flows into the side-through grooves 21a and 21b by the funneling effect.

The four corners of the square part 24 are made slightly smaller than the outer diameter of the shank 2. This is done for preventing abrasion of a grind stone in axial-grinding, and for eliminating a fluctuation of the axial. At the two corners on the diagonal line, the side-through grooves 21a and 21b having a linear shape are formed, and the cutting portion groove is formed directly below these side-through grooves 21a and 21b.

Although the square part 24 is necessary to find the starting point of the spiral thread mainly in regrinding, it is also possible to have a round rod shank part without the square part.

In the following paragraphs, the feed rate will be explained.

For example, in the case when the feed rate per revolution is 0.1 mm with 1 pitch=1.0 mm and the nominal diameter of 6 mm, then the spiral convex part will be cut by 0.1 mm by the finishing spiral blade part in each revolution. Accordingly, all of the spiral convex part will be cut by the 10th revolution, and a hole without the spiral convex part will be formed.

In practice, due to issues such as the amount of heat generation and the like, usual drills have the feed rate ranging usually from 0.05 mm-0.2 mm. In the drill of the present invention, the feed rate ranging from 0.05 mm-0.4 mm is appropriate.

In the operation at a feed rate of more than or equal to 0.2 mm with a manual driver, there will be such a powerful thrust resistance that an operator can physically feel the damage to the drill. Therefore, it is not appropriate to use a feed rate exceeding 0.2 mm, and thus with a manual driver, the feed rate of less than or equal to 0.05 mm is appropriate so that an operator can feel physical safety.

In order to achieve a greater cutting feed rate per revolution than a usual drill (a feed rate of 0.05 mm-0.2 mm) or an end mill (for example, a feed rate of 0.4 mm), as shown in FIG. 3, the drill 1 is provided with a relief surface 16 without a margin formed on the diameter-enlarging spiral threads AK1-DK4, and a relief surface 17 without a margin formed on the finishing spiral threads AF1-DF5. Each blade of the diameter-enlarging spiral threads AK1-DK4 through the finishing spiral threads AF1-DF5 shares and performs the cutting so as to deal with the abrasion of the blade tip.

By having the relief surface 16 and the relief surface 17, the portion contacting with the cutting wall is reduced as much as possible, and thus the cutting power of the cutting tip becomes sharp. Also it is ensured that chips do not stay in the ridge line of the diameter-enlarging spiral threads AK1-DK4 and the finishing spiral threads AF1-DF5.

To have a cutting hole be a flat wall without the spiral convex part, the cutting feed rate must be smaller than the crest width of both of the diameter-enlarging spiral threads AK1-DK4 and the finishing spiral threads AF1-DF5 or smaller than the crest width of either of the diameter-enlarging spiral threads AK1-DK4 or the finishing spiral threads AF1-DF5. In other words, the concerned crest width must be greater than the cutting feed rate.

In the case of a quadruple-blade as drill 1, it is preferable that the blades of the first land A to the fourth land D perform cutting while shifted by 0.25 pitch.

By having the even number of cutting grooves, all cutting portion grooves can be the communication cutting portion grooves and the non-communication cutting portion grooves which are communicated by the cutting portion groove communication concave portion 23a, 23b. Therefore, it becomes possible to achieve a uniform smooth discharge motion and collection of all chips by the gas for cooling and chip discharging G, and cool every corner of the cutting part efficiently and uniformly.

It is preferable to apply a hard film including a diamond coating having a small coefficient of friction and high abrasion resistance such as DIA (ultrafine crystal diamond coating, hardness 9000 Hv), DG (a coating dedicated for graphite, hardness 9000 Hv), DLC (Diamond Like Carbon, hardness 6000 Hv), and NPD (nano-polycrystalline diamond) and the like.

It is possible to grind and form the cutting portion 3 including the pilot blade 6 and the shank 2 integrally from a single material, or it is also possible to grind and form the pilot blade 6 separately from other materials, followed by retrofitting it by bonding.

The lands and the cutting portion grooves are not limited to the structure with four lands and 4 cutting portion grooves, as illustrated in this embodiment. It is also possible to have structures having two, three, five, six or more lands and cutting portion grooves. However, it is preferable to have the even number of the lands and the cutting portion grooves from the viewpoint of postural stability.

Regarding a cutting feed rate of the drill, in a case of a thread formed by thread grinding, the cutting feed rate per revolution for having a flat wall finish without forming the spiral convex part 20 in the wall of the cutting hole formed in a material to be machined S is set to be less than or equal to the crest width (P (pitch)/8).

However, it is also possible to have a thread having a crest width, a dent bottom width, a crest height, a dent depth, a spiral line shape, and a mountain form which are different from the standard of screw. In particular, by widening the crest width of the diameter-enlarging spiral thread portion 9 and the finishing spiral thread portion 12 more than the crest width of the thread P (pitch)/8, it becomes possible to extend the degree of freedom of the feed rate.

Further, by making the dent bottom shallower, the rigidity of a tool can be increased.

In the following examples of the different types of FRP are described.

Glass fiber reinforced plastic (GFRP): It is relatively inexpensive and has excellent radio wave permeability.

Carbon fiber reinforced plastics (CFRP): It is used as a successor of aluminum alloy.

Boron fiber reinforced plastic (BFRP): It has high strength and ant-bullet characteristics, and is often used in such as military weapons.

Aramid fiber reinforced plastic (AFRP, KFRP): It is reinforced by Aramid fiber (Kevlar), and has excellent impact resistance.

Regarding its heat resistance, the thermal deformation temperature is determined to be more than or equal to 200° C. by JIS-K-6911.

(1) Most of the chips generated by the drill 1 are granulated state (hereinafter referred to as "granulated chip"), and are very different from fine powdery chips generated with a conventional drill.

More specifically, when the chips generated by a conventional drill are put on fingers and rubbed between the fingers, a large amount of fine powder can be felt. Even the hands are slapped to send the powder away, still some of the fine powder remains in fine gaps of the skin. There is a large amount of fine powder such that the fine power still remains even after the hands are washed with water.

On the other hand, regarding the chips from the drill 1 of the present invention, the presence of the fine powder cannot be felt. When hands are slapped to send the chips away, most of the chips will fall off. Further when the chips are washed with water, the chips can almost completely fall off.

Therefore, it will not be an exaggeration to say that the chips are only the chips having granulated state which hardly includes any fine powder.

This chips discharged by cutting without suction will be deposited around the hole with hardly scattering in the air in the case of the drill 1. On the other hand, in the case of a conventional drill, the fine dust chips are scattering in the air (see FIG. 5). Also from the lack of roughness of the chips at the inlet and outlet of the hole felt by patting with fingers, the differences are obvious.

The reason for this is that if granulated chips cut by the pilot blade and the cutting portion enter into the first cutting portion groove 5a to the fourth cutting portion groove 5d, most of the chips will flow smoothly into a large number of spiral dents 14 and be discharged smoothly to the adjacent cutting portion groove. With a repetition of this process, the chips are carried smoothly to the inlet of the cutting hole by the spiral dent structure. That is, in the case of the presence of a margin, the granulated chips repeat a so-called flow operation in which the granulated chips flow into the spiral dent 14 without entering the margin, and are discharged to the cutting portion groove, and then flow into the next spiral dent, and are discharged to the next cutting portion groove. As a result, the granulated chips do not get pulverized (without becoming fine powder), and get smoothly discharged from the inlet of the cutting hole with keeping its granule state.

That is, even when there is a margin, the chips smoothly flow into the spiral dent 14 and most of the chips will not forcibly enter the margin. Therefore, there is no rise in the contact pressure between the margin and the cutting hole wall. Accordingly, there will be no marked rise in the temperature due to heat generation. Also, there is no marked acceleration in the abrasion of the cutting edge. That is, as it is difficult to have heat generation and the contact pressure between the margin and the cutting hole wall is low, the finishing of the cutting hole can be achieved with the high quality.

Further, as it becomes possible to machine at the low cutting temperature where the resin of the CFRP will not be soften, degradation of the CFRP due to heat can be avoided, and also the finishing of the cutting hole can be achieved with the high quality.

(2) As described in (1), since there is no softening of the chips and the cutting hole wall surface because of the heat, the chips move smoothly and be discharged in a rigid state in which adhering and clinging do not occur. In addition, since the pilot cutting hole formed by the pilot blade 6 is continuously subjected to segmented diameter-enlarging cutting or split diameter-enlarging cutting by a large number of diameter-enlarging blades of the diameter-enlarging spiral thread portion 9 (for example, regarding the lands of Example 1, there are the first land to the fourth land. The first land has four blades so the total number of the diameter-enlarging blades of the diameter-enlarging spiral thread portion is 16. (see FIG. 2), the granulated chips will efficiently flow into the spiral dent smoothly with keeping its rigid state in which each chip is not mutually adhering and clinging.

Since the cutting feed rate in this machining process is set so as to form a flat wall surface without forming a spiral convex portion on the wall surface of the cutting hole, the diameter-enlarging cutting produces a high quality flat wall.

In addition, since the diameter-enlarging blades of the diameter-enlarging spiral threads AK1-DK4 and the finishing blades of the finishing spiral threads AF1-DF5 are segmented or divided by the first cutting portion groove 5a through the fourth cutting portion groove 5d, and thus carbon fiber is cut every time by each diameter-enlarging blade and each finishing blade, the length of the carbon filer will become short.

That is, a mechanism and an operation are realized in which there are no occurrence or small likelihood of the occurrence of the increase of uncut-long fibers of the carbon fiber, the fracture with adhesion of soft resin by the uncut-long fibers being caught in a rotating tool and pulled, and the fluffing due to the remaining uncut-long fibers.

(3) In the cutting portion 3, the cutting portion grooves and the spiral thread portion including the diameter-enlarging spiral thread portion 9 and the finishing spiral thread portion 12 are arranged alternately. Therefore, delamination remained even after the cutting with the diameter-enlarging spiral blade portion 18 will be finished with the finishing spiral blade portion 19 having 24 numbers of finishing blades by repeating the cutting of the same portion so as to obtain a clean finish (reamer function). According to this point, a cutting hole on which no delamination and the like are left can be achieved, and its cutting surface can be finished with the high accuracy.

In other words, the drill according to the present invention is a drill provided with a split reamer blade having a reamer part (finishing part) of a segmented blade structure or a split blade structure.

(4) In a withdrawing operation of the drill, since the cutting hole has a flat wall surface, it is possible to perform the withdrawing operation with keeping the rotation of cutting.

By letting the drill do the withdrawing operation with keeping the rotation of cutting, even in the withdrawing operation, the group of the finishing blades of the finishing spiral threads AF1-DF5 performs the withdrawing operation and cutting, and thus even any slight fluffing which still remains will be harvested by this withdrawing operation and cutting.

(5) It is possible to increase the cutting feed rate because the heat generation is small. Even if a pilot cutting hole made by the pilot blade 6 at the cutting feed rate happens to have a rough surface, it is still possible to finish the cutting hole with high quality with the subsequent cutting which is done by the diameter-enlarging spiral thread portion and the finishing spiral thread portion in which a large number of cutting blades perform a conscientious segmented cutting or split cutting.

In fact, although cutting of a hole was conducted by using the drill of the present invention to open a cutting hole of 6 mm at the cutting feed rate of 0.4 mm per revolution, the excellent finish of the hole was achieved in which the occurrence of delamination was not identified. From the viewpoint of the fact that the feed rate per revolution for both of drills for carbon fiber and steel is 0.05 mm-0.2 mm, the result is particularly remarkable.

Machining test using a prototype will be described
<Shape of a Drill and Surface Treatment>
Base material: Carbide
Drill: nominal diameter 6 mm.
Shape of pilot blade:
Drill blade (equivalent to the pilot blade 6 of Example 1)
Ball end mill (equivalent to the pilot blade 43 of Example 5)
Surface treatment
   Untreated item
   Hydrogen-free DLC coat
   Thin film diamond DIA coat
<Machining Conditions>
Material to be machined: CFRP (thickness 5 mm, surface cross weave, double-sided glazing)
Spindle speed: 2500 rpm
Cutting speed: 47 m/min
Feed rate: 125 mm/min
Feed rate per revolution: 0.05 mm/rev
Coolant: None
Removal of chips: Suction by putting a suction nozzle of a vacuum cleaner near the drill
Fixed cycle: G18 non-step
Machining machine: VKC45II (Hitachi Seiki Co., Ltd.)
<Machining Target>
Untreated item: There shall be no burr or delamination even after machining 30 holes.
Coated item: There shall be no burr or delamination even after machining 150 holes.
(Machining Test Results)

| Surface treatment | Pilot blade | Number of holes | Number of holes when delamination began |
|---|---|---|---|
| Untreated item | Pilot blade 43 | 200 holes | 50 holes |
| DLC | Pilot blade 43 | 400 holes | 100 holes |
| DIA | Pilot blade 43 | 2000 holes | 1400 holes |
| DIA | Pilot blade 6 | 1400 holes | 400 holes |

Further, in cutting of KFRP (Aramid fiber reinforced plastic) having thickness of 5 mm by the DIA coated pilot blade 6, delamination started to appear after 200th hole.

Regarding the thin film diamond DIA coated item, it was possible to greatly exceed the initial target number of holes, and in particular, excellent results was able to be obtained with the pilot blade 43.
In addition, the maximum exothermic temperature of the second hole of the DIA-coated pilot blade 43 (cutting feed rate 0.05 mm) was 62.41° C. (the temperature before the start of cutting 18.68° C.), and the temperature rise due to heat generation was 43.73° C. Regarding the temperature measurement condition, the maximum exothermic temperature was the highest temperature when the drill completed cutting and the drill tip came to the inlet of the cutting while the temperature of the drill was monitored by infrared thermography.

Even though the drill of the present invention is suitable for making a hole (drilling) in a material which it is hard to perform cutting/machining on, and is represented by FRP such as CFRP (carbon fiber reinforced plastic) or the like, a material to be machined (work material) is not limited to these. The drill of the present invention is ideal as a drilling tool for various metal members such as aluminum die-casting, copper die-casting, titanium alloy, CFRP and composite materials of these alloys, composite members or multilayer members made from metal members and synthetic resins and the like, wooden members, and synthetic resin members.

Since the drill of the present invention is not used for cutting threads, it is possible to make helical dents shallow without being ruled by the standard of screws. Therefore, it is possible to enhance the rigidity of the drill, and for example, a drill of having less than or equal to 3 mm in diameter can be realized.

The finishing spiral blade portion 12 may be the same as a thread formed by thread grinding.
This is because the drill can be easily produced by a device and technology for making a cutting tap.

In the case of making the drill by thread grinding, it is desirable to form the drill by shaving the crest up to a position where the crest width of the finishing blade (the finishing spiral threads AF1-DF5) becomes P/8+α described above. This is because it is easily realized by shaving more than P/8 of the crest of the thread grinding.

Also, since the crest cutting is formed up to a position of P/8+α by outer diameter grinding, in the thread grinding of the standard nominal size of the screw, there is likelihood that a desired outer diameter size cannot be obtained.

In such a case, it can be easily achieved by increasing the effective diameter size (see FIG. 7) up to a position where the desired outer diameter size (at the position where the crest width is P/8+α) is obtained.

In forming the drill 1 by thread grinding, the crest widths of all spiral threads are made as P/8 or P/8+α by thread grinding, and then grinding for forming a diameter-enlarging spiral threads is carried out to form inclination at the diameter-enlarging spiral threads at the locations where the diameter-enlarging spiral thread portion will be formed. Finally the pilot blade is formed. Therefore, the crest widths become wider as the diameter-enlarging spiral threads are close to the tip side.

As a method for setting the crest width of the finishing blade to P/8+α, it is most appropriate to decrease the height of the thread.

More specifically, this can be easily achieved by taking the nominal dimension as a desired outer diameter size W, making the effective diameter size $W_2$ be a size so as to obtain the desired outer diameter size W, and followed by reducing the height of the thread $H_2$ by cutting.

In order to make the crest width wider than P/8 by 0.1 mm, $H_2$ is decreased by 0.173 mm (0.1×√3=0.173 mm). In this case, in order to ensure the nominal size which is the desired outer diameter size (outer diameter size D), the effective diameter size of the thread grinding is increased by 0.346 mm (0.173×2) (G=0.173 mm) (refer to FIG. 7).

In order to make the crest width wider than P/8 by 0.2 mm, $H_2$ is lowered by 0.346 mm (0.2×√3=0.346 mm). In this case, in order to ensure the nominal size which is the desired outer diameter size (outer diameter size D), the effective diameter size of the thread grinding is increased by 0.692 mm (0.346×2) (G=0.346 mm) (refer to FIG. 7).

A sharp-pointed thread (=a group of the pointed threads) to be having the crest width of P/8+α is formed by thread grinding, and the sharp-pointed thread is formed at a position where the desired outer diameter size is obtained by grinding an outer diameter of the pointed thread and where the crest width is P/8+α. After the grinding of the outer diameter is performed, a diameter-enlarging spiral thread portion is formed by chamfer grinding, in this way the configuration of the drill 1 can be achieved.

Lowering the height of the thread $H_2$ (which varies with the position of the dent) by cutting makes it possible to use a grinding wheel for thread grinding without modifying the grinding wheel, and to grind so as to have the greater effective diameter size than normal products of thread grinding. Therefore, it is possible to decide the crest width by outer diameter grinding. Accordingly, there are advantages in the aspects of cost, technologies, facilities and equipment because the conventional grinding wheel for thread grinding can be used as it is to make the drill.

The crest width may be also P/n+α (n represents the number of grooves (hereinafter "groove number") and a being 0.01 mm-0.5 mm). It is also possible to replace "(P/8+α) (α: 0.01 mm-0.5 mm)" in FIG. 7 by "(P/n+α) (n: the groove number, α: 0.01 mm-0.5 mm)."

The crest width of P/n+α is normally wider than the crest width of P/8+α, this makes it possible to increase the degree of cutting freedom.

In the case when the groove number is equal to 4, the crest width is P/4. This means that the pitch (P) of the finishing blade is deviated by P/4 for each land. If the crest width is more than or equal to P/4, that is, P/4+α, a hole without a step can be made.

Figure 6:
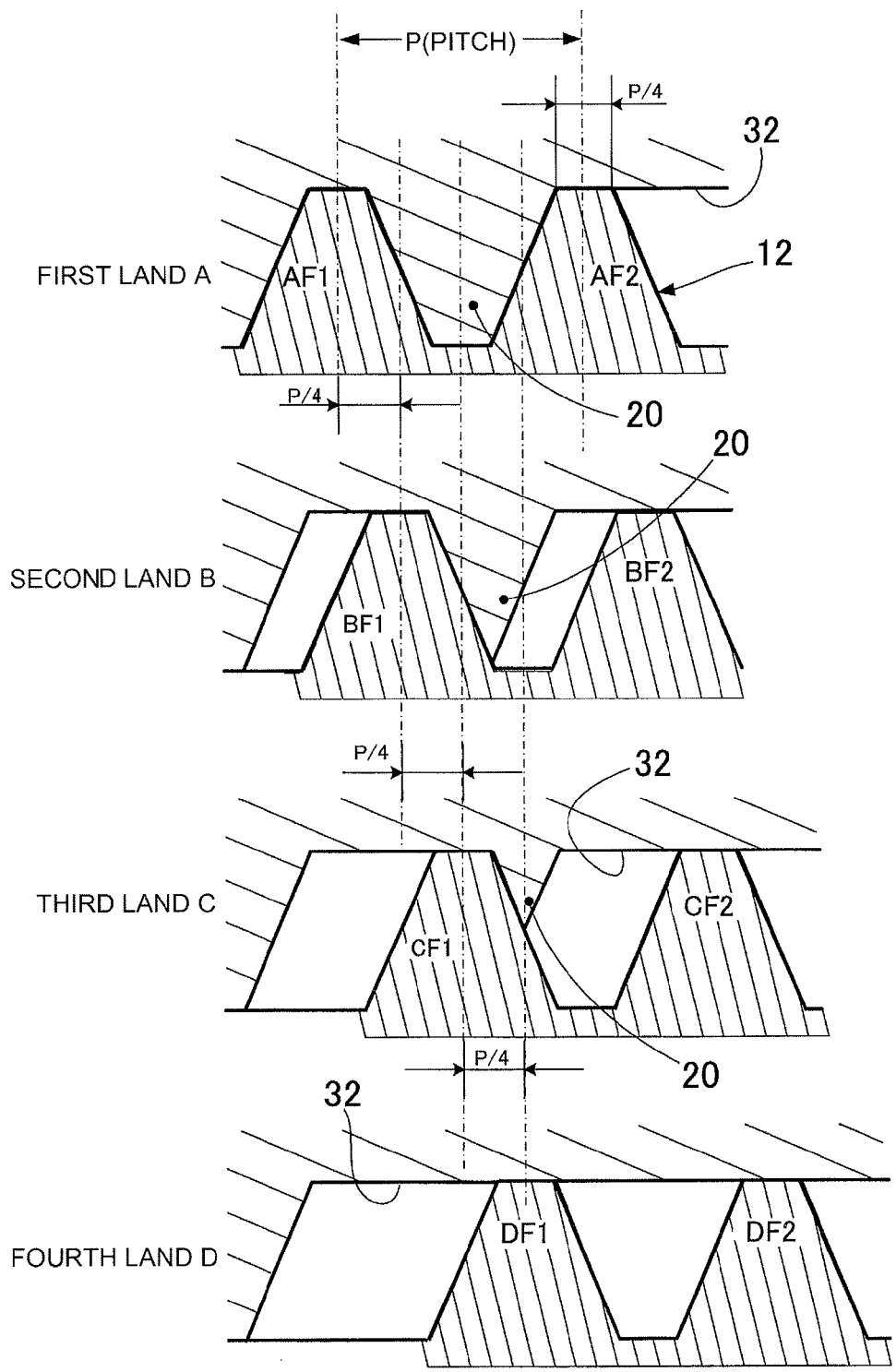
FIG. 6 is an explanatory drawing of cutting flow of Example 1 of the present invention.

With reference to FIG. 6, a situation in which the spiral convex part 20 is gradually cut will be described. In this situation when the crest width is P/4, and the spiral convex part 20 is gradually cut by P/4 by the following finishing blade of the finishing spiral threads, first, the spiral convex part 20 is formed between the finishing spiral threads AF1 and AF2 of the first land. Then, ¼ of the spiral convex part 20 is cut by the finishing spiral thread BF1 of the second land B which follows the finishing spiral thread AF1. Next, ¼ of the remaining spiral convex part 20 is cut by the finishing spiral thread CF1 of the third land C which follows the finishing spiral thread BF1. Finally, the remaining spiral convex part 20 (the rest of ¼) is cut by the finishing spiral thread DF1 of the fourth land D which follows the finishing spiral thread CF1.

Regarding "α" of P/8+α and P/4+α.

Instead of drilling at the feed rate which is the same as the pitch, the drilling with the drill 1 is performed at the feed rate which is smaller than the pitch. Therefore, α is not required in the calculation since the spiral convex part is cut without any leftover in the calculation.

However, in practice, variation occurs in the crest width due to the pitch error and the angle error in thread grinding. Thus, there will be an increased likelihood that a trace of the spiral convex part 20 remains in the hole due to the variation. Further, in the case that the feed rate per rotation is non-uniform as the drilling and machining by a manual driver having the individual differences in the feed rate, there is also more likelihood that an uncut part remains.

Therefore, by providing a wider crest width added with a (between 0.01 mm-0.5 mm), the formation of the spiral convex part (step) inside the hole is prevented even when there are such variations.

The crest width of the finishing spiral thread portion is selected based on the groove number (=number of blades) and the pitch as follows.

The groove number is represented by n, and pitch is represented by P.

The crest width is represented by (P/n+α).

α is preferably set in the range of 0.01 mm-0.5 mm, more preferably in the range of 0.01 mm-0.3 mm, and further more preferably in the range of 0.01 mm-0.2 mm. Further, it is also possible to set in the range of 0.05 mm-0.5 mm, 0.05 mm-0.3 mm, and 0.05 mm-0.2 mm. This is done in order to prevent the occurrence of uncut parts due to the variations by pitch errors and angle errors, and it is adequate to set α in the range of correcting the variation in the crest width.

A specific example of the relationship of the pitch: P, the groove number: n, and +α is shown below.

| P mm | n (No.) | Crest width + (α) mm | n (No.) | Crest width + (α) mm |
|---|---|---|---|---|
| 1.0 | 3 | 0.3333 + (0.1-0.2) | 4 | 0.2500 + (0.1-0.2) |
| 1.25 | 3 | 0.4167 + (0.1-0.2) | 4 | 0.3125 + (0.1-0.2) |
| 1.5 | 3 | 0.5000 + (0.1-0.2) | 4 | 0.3750 + (0.1-0.2) |
| 1.0 ÷ 3 = 0.3333 | | 1.25 ÷ 3 = 0.4167 | | 1.5 ÷ 3 = 0.5000 |
| 1.0 ÷ 4 = 0.2500 | | 1.25 ÷ 4 = 0.3125 | | 1.5 ÷ 4 = 0.3750 |

However, in thread grinding, a magnet must be dressed so as to be thinner just for the amount where the width of the dent is to be narrowed. When the magnet is made thin, naturally the consumption of the magnet will be hastened, and thus the abrasion of the magnet will be hastened too. Therefore, the number of dressing will be increased, which leads to a rise in cost.

Accordingly, making the drill of the present invention by thread grinding is suitable, not only from the technological point of view but also from the equipment point of view.

The drilling operation of the drill 1 in practice (drilling operation) is performed by a synthesized operation of the pitch, the crest width, the deviation in pitch, the feed rate, and the rotational speed.

Although it is preferable to choose an even number of grooves, by avoiding the odd number of grooves as much as possible, in case of a drill with less than or equal to 3 mm by thread grinding, the number of grooves to choose is preferably 3 so as to ensure the strength of the drill. The number of side-through grooves in this case is set to be 1 or 2, and the number of communication cutting portion grooves communicated directly with the side-through grooves is set to be 1 or 2. The number of non-communication cutting portion grooves which are not communicated with the side-through grooves is set to be 2 or 1.

In the case when a small diameter sized drill having 3 grooves is required, if there is any effect on the straight travel property of the drill because of providing the cutting portion groove communication concave portions 23a and 23b in the pilot blade, it is possible to provide the drill with a tip shape of normal drills without providing the cutting portion groove communication concave portions 23a and 23b. In this case, the generated chips are preferably treated only with suction from the outside.

Figure 7:
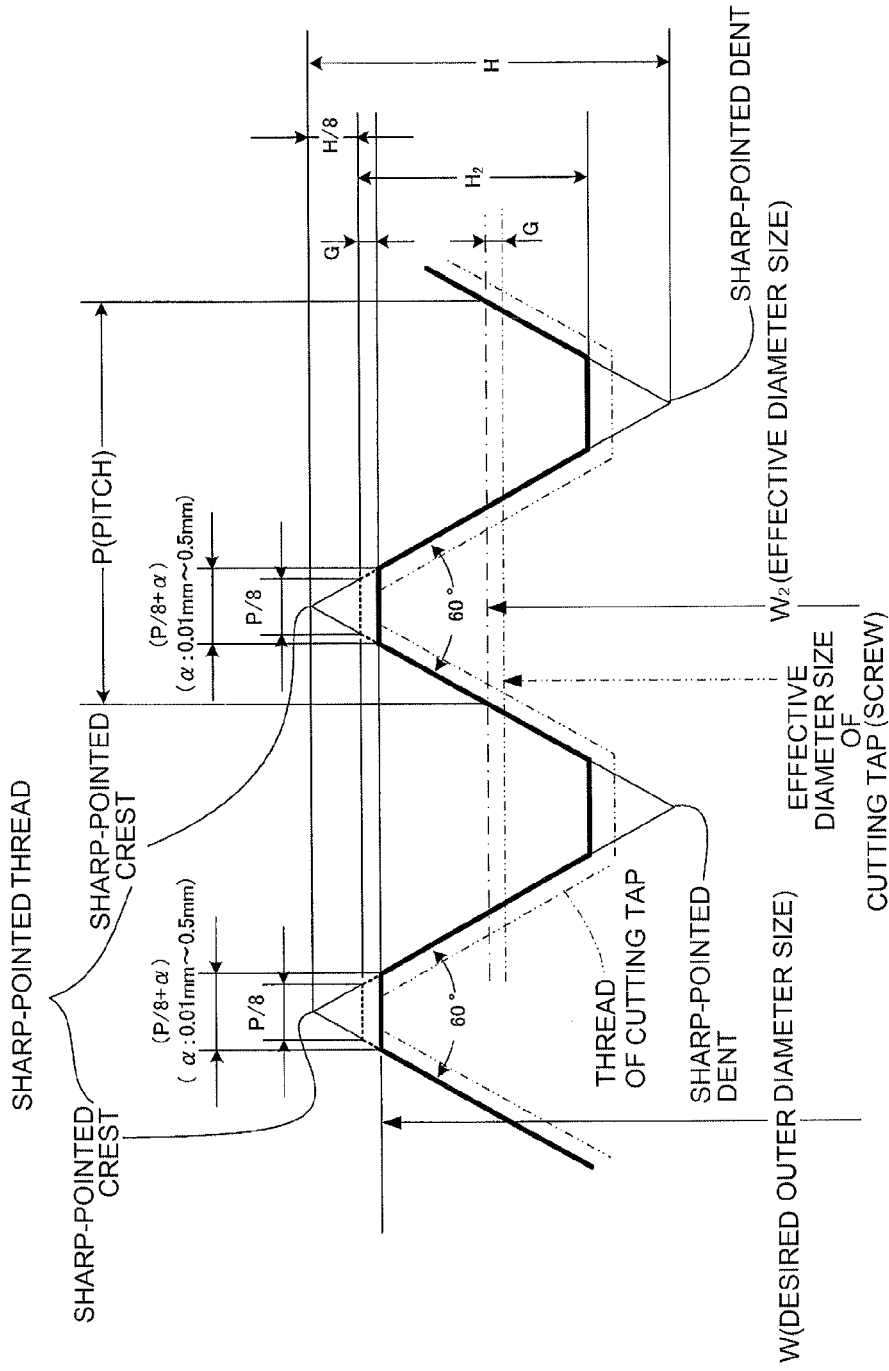
FIG. 7 is a conceptual diagram showing a formation position of crests in Example 1 of the present invention.

In FIG. 7, without changing the height of $H_2$, it is also possible to set the crest width to P/8+α. In this case, the dent width will become correspondingly narrower, so that it will be impossible to form a drill with a grinding wheel for thread grinding.

However, since the drill of the present invention is not used for forming a thread, it is possible to form a spiral dent having a bottom width greater than the screw dent by a grinding wheel having a wide tip. Since the grinding wheel has a tip width greater than that for thread grinding, its service life becomes long, and the number of dressing can be reduced to less than that for the thread grinding.

The diameter-enlarging spiral thread portion, the finishing spiral thread portion, and the spiral dents are not ruled by the standard or structure of a thread, and may have a structure in which the width (pitch) of the spiral thread portion and the spiral dent are different, a structure in which the spiral is different from the spiral of a screw (the twist of the spiral is smaller than a screw), or a structure in which the structure of the spiral thread is different from a trapezoidal structure of a screw (for example, square shape).

It is also possible to achieve cooling effect with a structure in which the cutting portion groove communication concave portions 23a and 23b are not provided.

That is, the gas for cooling and chip discharging G, which is supplied from the side-through grooves 21a and 21b, flows into the second cutting portion groove 5b and the fourth cutting portion groove 5d, flows into the spiral dent, and then flows to the first and third cutting portion grooves 5a and 5c. Then, the gas flows backward in the first and third cutting portion grooves 5a and 5c, and is continuously discharged from the inlet of the cutting hole. In this process, since the gas for cooling and chip discharging G will also flow into the spiral dent of the diameter-enlarging spiral blade portion 18 and perform cooling, the heat of the pilot blade is removed, and thus the heat generation of the pilot blade can be reduced.

Example 2

FIG. 8 illustrates a second example of the present invention. This example is different from Example 1 in that a configuration is provided in which a gas scatter-prevention cylinder 34 having a flange portion 27 in the front side of the gas scatter-prevention cylinder 34 (lower side in the figure) is fitted immovably to a part of the shank 2 where the chuck device 22 is not chucked.

In addition, a work surface contact opening part 28 contacting with a surface of a material to be machined (S), a cylindrical part 29 extending from the work surface contact opening part 28, a suction port 30 for connecting a suction device (not illustrated in the figures) provided at the cylindrical part 29, and a shank side passing part 31 provided at the rear side of the cylindrical part 29 (upper side in the figure) having a structure in which the gas scatter-prevention cylinder 34 passes through and the flange part 27 cannot pass through are also provided.

A suction cover 33 for suctioning the chips discharged from a cutting hole inlet 35 of a cutting hole 32 is provided or is attachable. By hitting the flange part 27 at an edge of the shank side passing part 31, a movement to the front side is stopped. On the other hand, by the work surface contact opening part 28 contacting with the surface of the material to be machined (S), a movement to the rear side of the suction cover 33 associated with the cutting feed is enabled.

With the cutting hole 32 being in the non-penetrable state, due to the gas for cooling and chip discharging G from the side-through grooves 21a and 21b, the chips jetted from the communication cutting portion grooves and the cutting hole inlet 35 are trapped in the suction cover 33. Thus, an efficient suctioning process can be achieved by the suction device without allowing the chips to scatter to the outside.

Even in the moment when the cutting hole 32 is penetrated, since the opening formed by a cutting hole outlet 36 and the non-communication cutting portion grooves, including the first cutting portion groove 5a and the third cutting portion groove 5c, functions as a suction port for sucking the air outside by the suction of the suction device, the chips are sucked along with the air outside without scattering. Therefore, it is possible to prevent the scattering of the chips even at the moment when the cutting hole 32 is penetrated and afterwards.

Instead of the flange part 27, it is also possible to provide a structure in which a protruding flange part is integrally formed in forming the shank 2. In this case, shank side passing part 31 is passed through the shank 2.

Example 3

FIG. 9 illustrates a third example of the present invention. This example is different from Example 1 in that a drill 42a has a configuration 1 in which a diameter-enlarging spiral thread portion 40a has the same length with the diameter-enlarging spiral thread portion 9 of the drill in Example 1, a dent bottom of a spiral dent 47a is formed linearly with an inclination angle of 2° to 8°, a pilot blade 39a has a smaller blade diameter than the pilot blade 6 of Example 1, and a cutting part 41a is provided.

By letting the diameter-enlarging spiral thread portion 40a have a moderate inclination of 2°-8°, the tip diameter of the diameter-enlarging spiral thread portion 40a becomes smaller. Since at the tip of the smaller diameter-enlarging spiral thread portion 40a, the pilot blade 39 with the same diameter is provided, the blade diameter of the pilot blade 39a becomes smaller. Therefore, it becomes possible to reduce the cutting resistance or the thrust force.

Further point of difference between Example 3 and Example 1 is forming a drill 42b having a configuration 2 in which a diameter-enlarging spiral thread portion 40b has a longer configuration than the diameter-enlarging spiral thread portion 9 of the drill in Example 1, a dent bottom of a spiral dent 47b is formed linearly with an inclination angle of 2° to 8°, a pilot blade 39b has a smaller blade diameter than the pilot blade 6 of Example 1, and a cutting part 41b is provided.

The distance of the diameter-enlarging spiral thread portion becomes longer as the amount of the inclination becomes moderate. Therefore, the number of diameter-enlarging spiral threads also increases, and the biting amount (the depth of cutting) of one diameter-enlarging blade into the material to be machined (S) is also reduced by a corresponding amount. In this way, it is possible to reduce the thrust force (cutting resistance) of the diameter-enlarging spiral blade portion, and also possible to improve its durability. This example is suitable for a penetrated-hole formation.

For sake of comparison, the drill 1 from the Example 1 is shown at bottom portion of FIG. 9, in which the dent bottom of the spiral dent 14 is horizontal (0°). It is also found that the pilot blade 39 has a smaller blade diameter than the pilot blade 6.

Example 4

Figure 10:
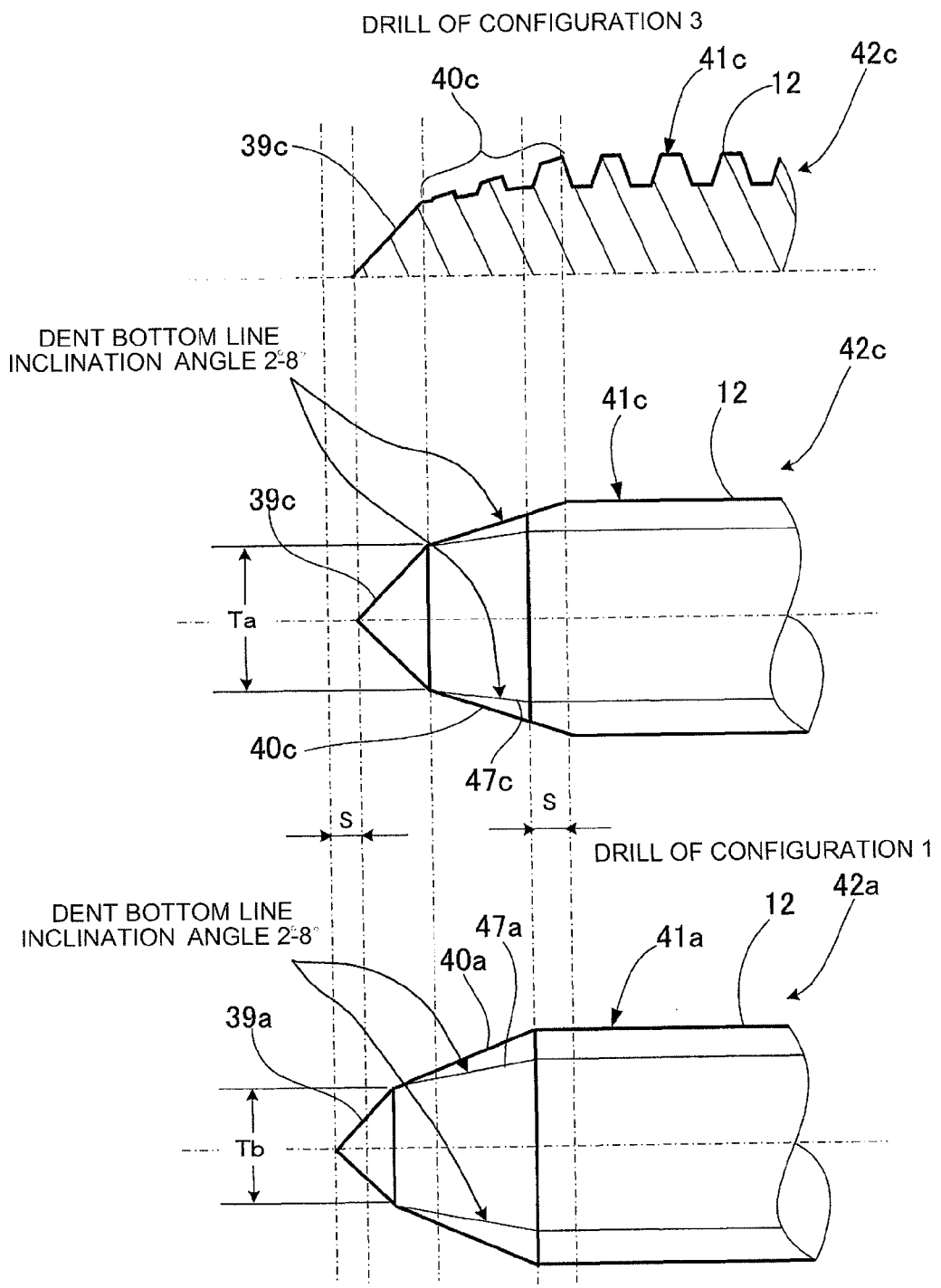
FIG. 10 shows a partial cross-sectional view and a conceptual view of the drill of configuration 3 of Example 4 of the present invention.

FIG. 10 illustrates a fourth example of the present invention. This example is different from Example 3 (drill 42a) in that a drill 42c having a configuration 3 is formed with a configuration in which a part of threads at the portion of the finishing spiral threads in the drill 42a is considered as a diameter-enlarging spiral thread of a diameter-enlarging spiral thread portion 40c by deviating the diameter-enlarging spiral thread portion by a distance S to the finishing spiral thread portion 12 side.

By "deviating by a distance S," it becomes possible to make the width Ta of the communication part between the diameter-enlarging spiral thread portion 40c and a pilot blade 39c greater than the width Tb of the communication part of the drill 42a of the configuration 1, and thereby the strength of the pilot blade 39c is increased.

This is an effective configuration for narrower drills with a diameter of less than or equal to 6 mm having a concern that the pilot blade might be too small.

Example 5

Figure 11:
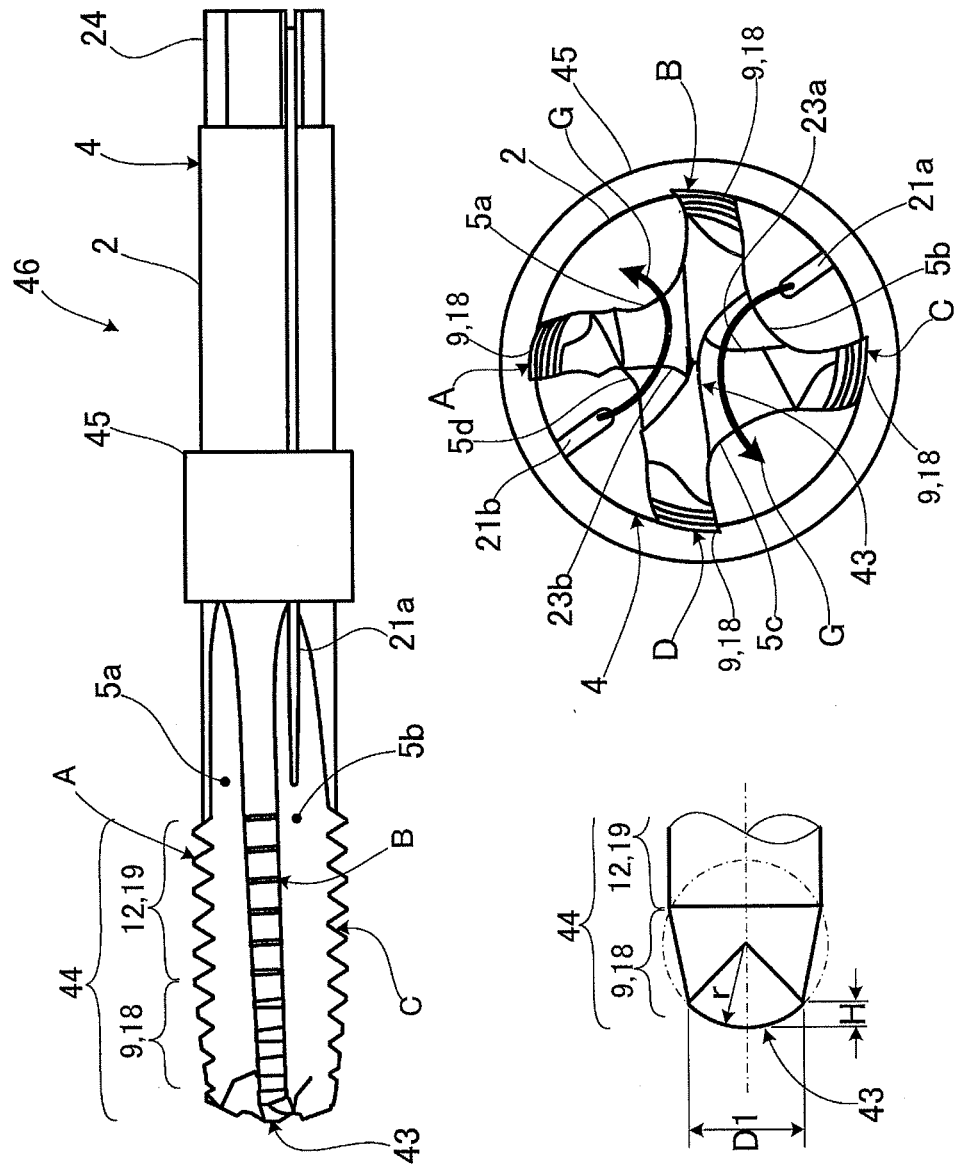
FIG. 11 is a side view, a simplified view and a magnified front view of the cutting portion of Example 5 of the present invention.

FIG. 11 illustrates a fifth example of the present invention. This example is different from Example 1 in that a drill 46 is formed with a configuration in which a pilot blade 43 is formed from a ball end mill blade (or an end mill blade with a bottom blade is also possible), a cutting part 44 is provided, and a gas scatter-prevention cylinder 45 is attached to the shank 2 by fitting.

By setting the height H of the pilot blade 43 to be H=r/3 to r/2, the rise in machining torque due to cutting resistance or abrasion is suppressed as much as possible.

The shape and structure of the pilot blade includes various configurations. For example, without having a curved shape with convex as in the pilot blade 43, there may be also a configuration having a curved shape with concave in reverse.

Example 6

Figure 12:
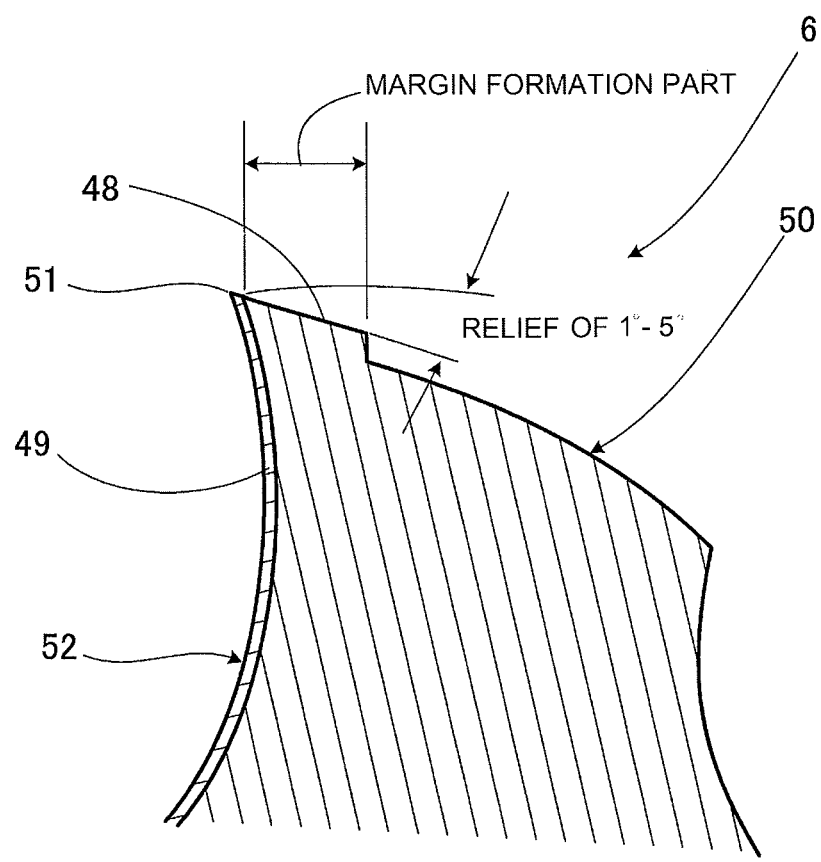
FIG. 12 shows a partial front view of the pilot blade of Example 6 of the present invention.

FIG. 12 illustrates a sixth example of the present invention. This example is different from Example 1 in that a relief 48 of 1°-5°, instead of a margin, at a place where a margin of the bottom blade of the pilot blade 6 is to be formed (hereinafter referred to as "margin forming place") so that the margin forming place does not contact with the cutting surface of the material to be machined (S).

With this, the sharpness can be enhanced, and cutting resistance is reduced. Accordingly, the surface where chips are pulverized is also reduced.

In addition, in the case when a margin is present in the diameter-enlarging spiral threads AK1-DK4 and the finishing spiral threads AF1-DF5, it is possible to provide a similar relief 48.

It is preferable to form a relief surface without a margin place from the initial formation of the drill.

In this example, a configuration is provided in which a high hardness film 49 made of a diamond coating is applied only to a rake surface 52 of the pilot blade, and the high hardness film 49 is not applied to the whole or apart of a relief surface 50 (including the relief 48).

By doing so, the relief 48 side will be worn earlier due to abrasion, and the high hardness film 49 is less subject to abrasion. Therefore, the high hardness film 49 will always form the cutting blade, i.e. there is a state in which the cutting blade is constantly sharpened. Accordingly, a drill whose sharpness lasts longer can be obtained.

The high hardness film 49 is not applied to a portion of the relief surface 50 which is close to the cutting edge 51 of pilot blade 6 or to the entire relief surface 50. In a case where a margin is present, it is possible to have a configuration in which the high hardness film 49 is not applied to the margin. The structure in which the high hardness film 49 is not applied may include a form in which a coating of the high hardness film 49 is removed later by grinding or a form in which a coating of the high hardness film 49 is removed by sputtering in which ion particles are collided and the like.

Alternative embodiments may include structures such as, for example, a structure in which the hard film 49 is provided only at the rake surface of the pilot blade, a structure in which the hard film 49 is provided only at the rake surfaces of the pilot blade and the diameter-enlarging spiral thread portion, or a structure in which the hard film 49 is provided only at the rake surfaces of the whole cutting portion.

Example 7

Figure 13:
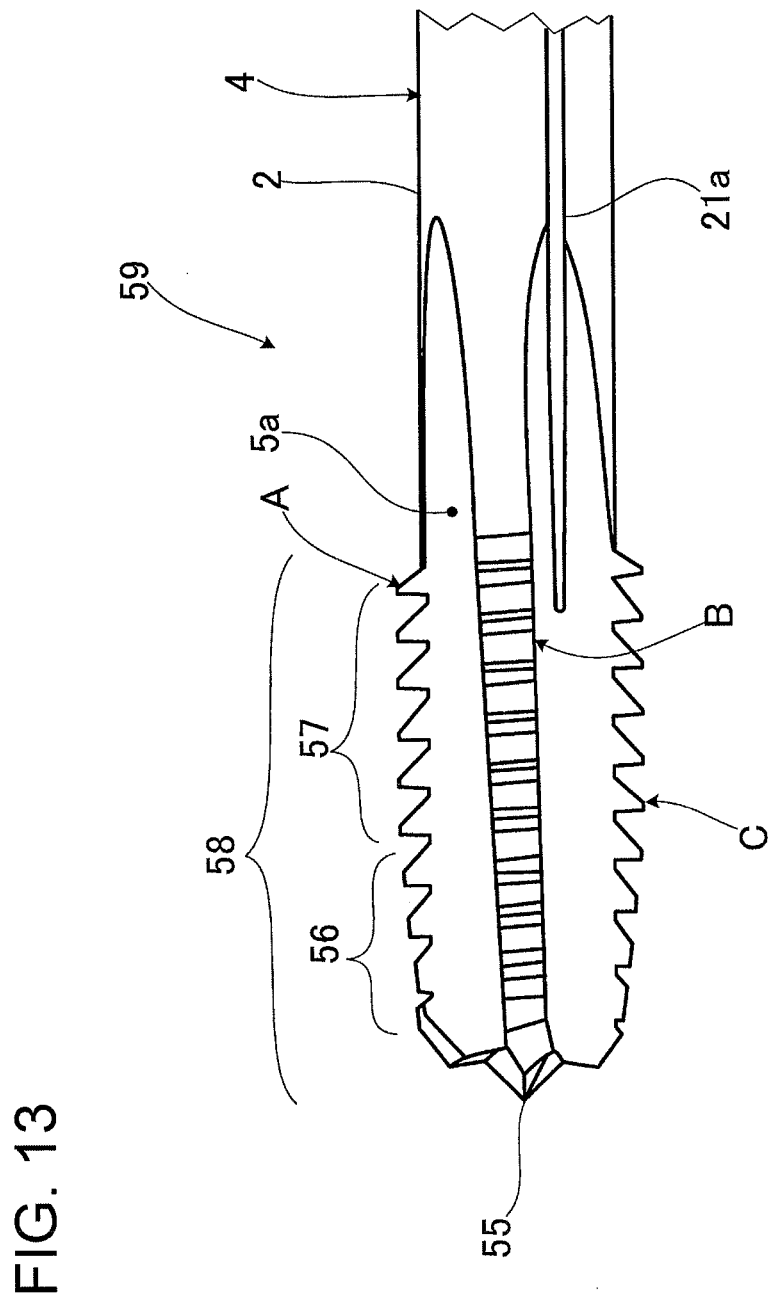
FIG. 13 is partial side view of Example 7 of the present invention.

FIG. 13 illustrates a seventh example of the present invention. This example is different from Example 1 in that a drill 59 is formed with a cutting portion 58 including a pilot blade 55 having a candle-type blade tip, a diameter-enlarging spiral thread portion 56 having a group of diameter-enlarging spiral threads having a saw-toothed shape, and a finishing spiral thread portion 57 having a group of finishing spiral threads having a saw-toothed shape.

In the saw-toothed shape, since a preceding crest surface is substantially vertical (in an alternative configuration it may not be vertical), and also a succeeding crest surface is a moderately inclined surface, it becomes possible to increase the heat release from the succeeding crest surface with a large surface area. Therefore, the saw-toothed shape contributes to enhancing the cutting efficiency.

Since the candle-shaped pilot blade 55 cuts with its outer peripheral blade and has an excellent centripetal property, the candle-shaped pilot blade 55 can perform an efficient cutting in the case when aramid fiber and the like is attached to cutting surfaces of the CFRP material.

The saw-toothed shape may be used at both of the diameter-enlarging spiral thread portion 56 and the finishing spiral thread portion 57 or either of the diameter-enlarging spiral thread portion 56 or the finishing spiral thread portion 57.

In the following, the effects of the modes and examples of the present invention are explained below.

The crest width of the cutting blade of the finishing spiral thread portion formed by thread grinding is P/8. In this case, by making the feed rate of the drill smaller than the crest width P/8, the spiral convex part will be gradually cut by the finishing spiral thread portion for each rotation. In this way, the spiral convex part will be completely cut after several rotations, and a hole without the spiral convex part will be formed.

The concrete effect of the case when the present invention is employed for drilling in CFRP (carbon fiber reinforced plastic) which is a typical material that is hard to be cut and machined will be explained.

(1) The size of chips from a conventional drill and size of chips from the drill of the present invention can be judged easily by the experiment in which the chips are put on fingers and rubbed between the fingers, and then the hands are slapped to send the chips away, or the hands are washed with water.

The chips from a conventional drill are so fine that the chips still remain in gaps of the finger skin even after slapping the hands to send the chips away, or washing the hands with water. On the other hand, the chips from the drill of the present invention have such a size that the chips hardly remain in the gap of the skin and will fall off when the hands are slapped to send the chips away, or the hands are washed with water.

In the cutting without suction of the chips, the powdery chips from a conventional drill are jetted and scattered in the air. On the other hand, the chips from the drill of the present invention are neatly shaped as a form of an accumulation mountain around the inlet of the hole (just like the form of an accumulation mountain of an entrance of ants nest), and scattering is not visually found. (refer to image diagram of FIG. 5)

The reason for this is that the granulated chips generated in the cutting portion disperse smoothly and flow into a plurality of spiral dents and are discharged smoothly to the adjacent cutting portion grooves, and further disperse smoothly and flow into a plurality of spiral dents of the next land. By repeating this operation, the chips are continuously carried smoothly to the inlet of the cutting hole by the structure of the plurality of spiral dents.

Therefore, in the case of the presence of a margin, most of the granulated chips do not forcibly enter the margin, smoothly flow into the spiral dent and be discharged to the cutting portion grooves. Accordingly, the granulated chips are hardly pulverized (without becoming fine powder), and get smoothly discharged from the inlet of the cutting hole with keeping its granule state.

Therefore, since there is extremely low likelihood that the chips enter between the margin and the cutting hole wall, the contact pressure will not increase. Therefore, there will be no marked rise in the temperature due to heat generation, and also there will be no marked acceleration in the abrasion of the cutting blade tip.

As it is difficult to have heat generation, and also the contact pressure between the drill and the cutting hole wall is low, there will be no occurrence of softening or dissolving and melting, and also delamination will not occur. Therefore, the cutting in a rigid state is carried out throughout the entire cutting process, and the finishing of the cutting hole (hole) can be high quality.

For example, according to the test results (no cooling) described in Example 1, the maximum exothermic temperature of the second hole (cutting feed rate 0.05 mm) of the DIA-coated pilot blade 43 (the drill 46 of Example 5) was 62.41° C. (the temperature before the start of cutting 18.68° C.), and the temperature rise due to heat generation was 43.73° C. It is obvious that the temperature is in a region much lower than 250° C.-350° C. which is the glass transition temperature (Tg) of CFRP.

(2) As described above, there is no softening of the chips and the cutting wall surface because of the heat. Therefore, discharging is performed by the chips and the air moving smoothly in a rigid state in which adhering does not occur.

In addition, since the pilot cutting hole formed by the pilot blade is gradually subjected to segmented diameter-enlarging cutting or split diameter-enlarging cutting by a large number of diameter-enlarging blades of the diameter-enlarging spiral thread portion (for example, in Example 1, 20 pieces of cutting blades in which the pilot blade is included), the granulated chips efficiently and smoothly enter into the spiral dent and flow into the adjacent cutting portion groove while keeping its rigid state in which each chip is not mutually adhering.

(3) In the finishing spiral thread portion, even if the sharpness of the preceding finishing blade becomes blunted, the succeeding finishing blade continues the finishing cutting with its sharpness, and thus a drill having a relatively high durability which is capable of continuing to form the cutting finish surface with high quality can be realized.

(4) The delamination or the uncut part of fiber remained even after the cutting with the diameter-enlarging spiral blade portion is finished by the segmented cutting action or split cutting action in which a plurality of finishing blades of the finishing spiral blade portion successively pass through the same spot (for example, 24 numbers of the finishing spiral blade in Example 1). Therefore, the cutting surface including the edges of the inlet and outlet of the cutting hole will get high quality finishing.

That is, a cutting operation is achieved in which there are no occurrence of the increase of uncut-long fibers of the carbon fiber, the fracture with adhesion of soft resin by the uncut-long fibers being caught in a rotating tool and pulled, and the fluffing due to the remaining uncut-long fibers.

In particular, since the hole exit (edge of the hole) is pushed out by the drill, the outermost surface layer is pushed out and thus easily prone to peeling. However, with the drill of the present invention, the outlet is subject to the diameter-enlargement by being gradually cut intermittently by a plurality of cutting blades, the pressing pressure due to the cutting blades is small. Therefore, there will be no peeling of the outermost surface layer.

By gently patting the inlet and outlet of the hole with finger, it is found that the fluffing, delamination and roughness of the edges in both sides of the inlet and outlet are extremely low.

Figure 5:
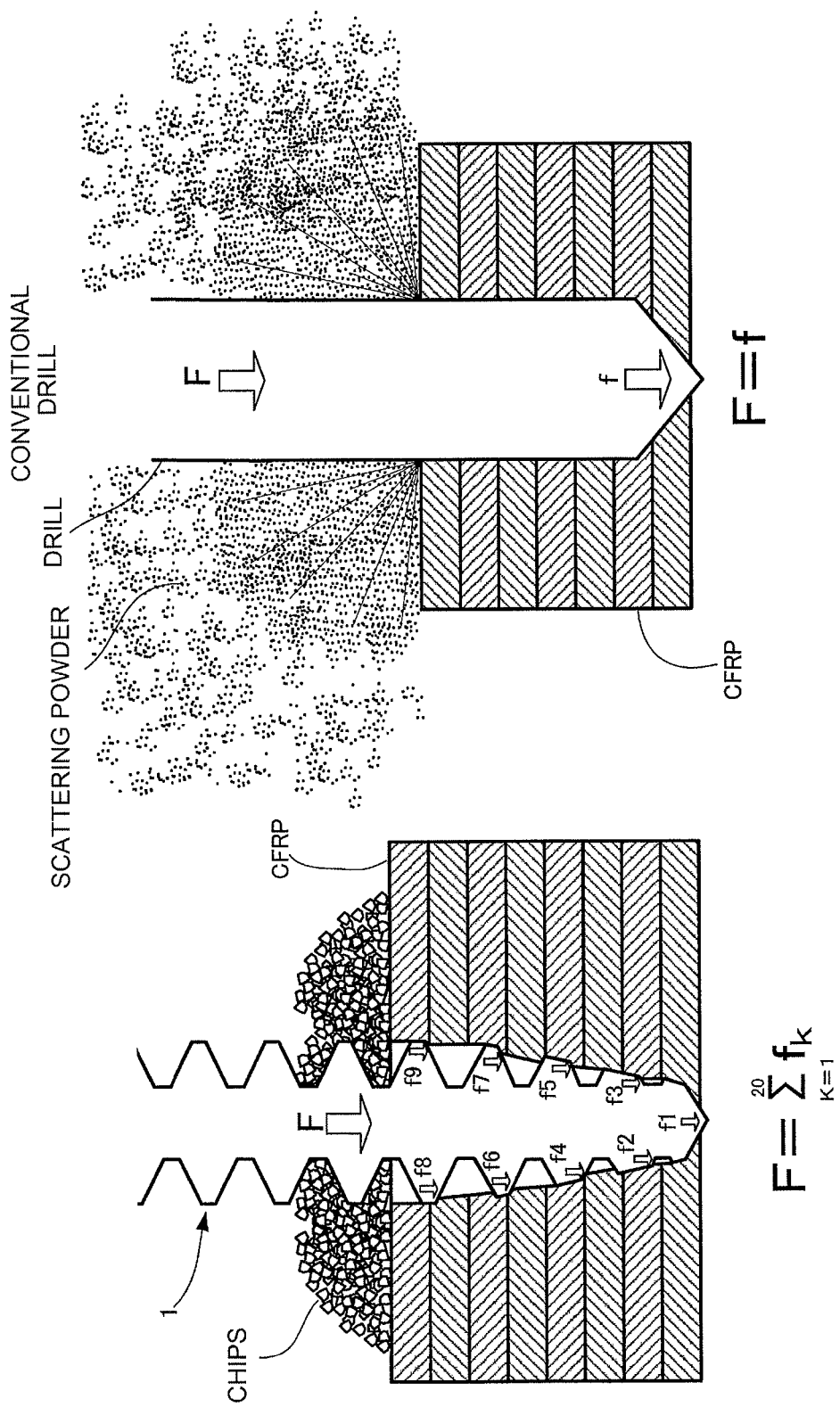
FIG. 5 shows a cutting condition diagram of Example 1 of the present invention and a cutting condition diagram of a conventional drill.

(5) Due to the segmented diameter-enlarging cutting or split diameter-enlarging cutting of the spiral convex part formation by a plurality of diameter-enlarging blades, the cutting load is dispersed (see FIG. 5: for example, in the drill of Example 1, the thrust force F from the machine side is dispersed to 20 numbers of blades as the calculation formula in the figure.) Therefore, since the cutting resistance of the diameter-enlarging blade (blade tip) and the amount of heat generation can be reduced, the diameter-enlarging blades can last longer.

(6) Regarding an operation of withdrawing the drill, it is possible to perform the withdrawal operation with keeping the rotation of cutting since the cutting hole has a flat wall surface. Therefore, even in the withdrawal operation, the withdrawal operation cutting is conducted by the group of finishing blades of the finishing blade threads, and thus even any slight fluffing which may still remain will be harvested.

(7) As explained above, since the chips are granulated, the particles are large and heavy. Therefore, the amount of chips scattering in work space is extremely small. Also, with the size of the particles, they will be surely caught in dust-protective masks of workers, and consequently the risk of inhalation of the particles by workers will be greatly reduced.

The chips can be suctioned with a suction device (which is configured such that the external air is also suctioned simultaneously when suctioning). In this case, from the beginning of cutting, the chips are surely suctioned without scattering. Further, in the case of opening a hole laterally, since the heavy chips keep falling, a strong suction force is not necessary. It is possible to provide a device to suction the chips with receiving the falling chips below.

(8) As the heat generation is small, it is possible to increase the cutting feed rate. Even if the pilot cutting hole made by the pilot blade has a rough surface because of a larger biting amount of the pilot blade, it is still possible to finish the cutting hole with high quality with the subsequent cutting by the diameter-enlarging spiral thread portion and the finishing spiral thread portion in which a large number of cutting blades perform a conscientious segmented cutting or split cutting.

(9) Since the biting cutting operation by the diameter-enlarging spiral blade portion for forming the spiral convex part, which is performed immediately after the pilot blade, has the function of maintaining the straight traveling property of the drill, the straight travel property will not be affected, even if a force obstructing the straight traveling of the drill occur. Therefore, for not only CFRP, but also any other material, which is hard to be cut, such as aluminum die-casting having non-uniformity in the internal composition, the straight travel property will not be affected, and the drilling operation with high precision can be achieved.

In the conventional drills, a margin portion was essential in order to maintain the straight travel property. However, according to the present invention, as it is possible to maintain the straight travel property without the margin portion, it became possible to provide a drill without the margin portion.

That is, it became possible to provide a drill in which the ridge line side, which is at the downstream side of the pilot blade, the ridge line sides of the pilot blade and the diameter-enlarging spiral blade, or the ridge line sides of the pilot blade, the diameter-enlarging spiral blade, and the finishing blade are all set as a relief surface (also referred to as "relief") which does not have a margin portion.

With a drill in which all the necessary parts in the ridge line side are a relief surface without having a margin portion, the sustention of the sharpness, reduction in thrust resistance, reduction in radial resistance, and solving the grinding pulverization phenomenon of chips become possible.

In this way, with the absence of the margin portion, there will be no occurrence of the phenomenon in which chips become fine by pulverization. Also, since the cutting resistance and thrust resistance are reduced, excellent sharpness which can last long, and small heat generation and improved durability can be achieved.

It is also possible to provide a side-through groove which supplies a coolant to the cutting portion groove by directly communicating a part of the cutting portion groove with the shank. With this configuration, the coolant supplied from the chuck device side passes through the side-through groove and flows into the communicating cutting portion groove. Then, the coolant is guided into the communicating cutting portion groove and forcibly is supplied to the pilot blade. The coolant reached the pilot blade will pass through the cutting groove communication concave portion and forcibly flows into the adjacent non-communication cutting portion groove. Then the coolant backward flows in the non-communication cutting portion groove, and is forcibly discharged from of the inlet of the cutting hole.

By adopting this configuration, with the gas for cooling and chip discharging which is forcibly injection-supplied and is forcibly flowed into the cutting portion grooves and the spiral dents at high speed, the cutting portion, the wall surface of the cutting hole, and chips are strongly cooled. Therefore, cutting at low temperature can be achieved. Accordingly, it is possible to remarkably enhance the durability. Further, even in terms of the size and the accuracy, it is possible to achieve the cutting finish with high accuracy.

Since the chips move at high speed due to the high speed of the coolant, the chips are discharged without remaining in the gap between the cutting wall surface and the drill or the spiral dents.

By letting the cutting portion groove to have a shape in which only the lead angle of the diameter-enlarging spiral thread portion and the finishing spiral thread portion is in the direction where stress is not generated towards the thrust direction in machining, it is possible to reduce the cutting resistance. A configuration may also be provided by twisting the cutting portion groove only by a lead angle amount, as an example twisting in the left direction (opposite direction of the normal screw spiral), followed by cutting a material to be machined at a perpendicular angle to the surface, it is possible to reduce the thrust force (cutting resistance). As a result, it is possible to enhance the durability of the drill and improve the machining quality of the cutting hole.

By setting the terminal outer diameter of the pilot blade to be the same as the tip outer diameter of the diameter-enlarging spiral thread portion, it is possible to make the pilot blade smaller. As a result, it is possible to reduce the cutting resistance of the pilot blade. Further, it is possible to extend the life of the diameter-enlarging blade since the biting amount of the diameter-enlarging blade can be a shallow biting amount.

By providing a configuration in which a sharp-pointed thread to be having the crest width of $P/8+\alpha$ is formed by thread grinding, and the sharp-pointed thread is formed at a position where the desired outer diameter size is obtained by grinding an outer diameter of the pointed thread and where the crest width is $P/8+\alpha$, it is possible to obtain following effects.

In practice, with the crest width of $P/8$, there is variation due to the pitch error and the angle error. Therefore, there is a higher likelihood of the occurrence of uncut part. Further, in the case where the feed rate is not stable or the feed rate per rotation is non-uniform as the drilling and machining by a manual driver having the individual differences in the feed rate, there is also a higher likelihood that an uncut part remains. Since the uncut part remains in the shape of a spiral convex part in the hole surface, it leads to a problem that the drill cannot be withdrawn while keeping its positive rotation.

By having the crest width of $P/8+\alpha$, it is possible to prevent the occurrence of uncut part because of such variations. Therefore, a reliable withdrawal of the drill while keeping its positive rotation, and the hole surface with high quality can be achieved.

Even in the case of drilling with a drill driver in which a person directly holds the drill driver in hand and conducts drilling and there exist individual differences in the feed rate, as it is possible to surely obtain a hole without a spiral convex part due to the broad crest width, the withdrawal operation can be reliably carried out with keeping the positive rotation.

By having a configuration in which the pitch is set as P, the number of grooves of cutting portion grooves is set as n, and the crest width of the crest of the finishing blade at the position where the desired outer diameter size of the finishing spiral thread portion is obtained is set as P/n, following effects can be obtained.

For example, when the cutting portion groove number n=6, P=1.0 mm, the crest width will be 1.0/6=0.16 mm. When the cutting portion groove number n=4, the crest width will be 1.0/4=0.25 mm. When the cutting portion groove number n=3, the crest width will be 1.0/3=0.33 mm. When the cutting portion groove number n=2, the crest width will be 1.0/2=0.5 mm.

That is, for any of the groove numbers mentioned above, since the crest width becomes larger than the standard screw crest width of 1.0/8=0.125 mm, so there is an effect that by the corresponding increase, the degree of freedom for the feed rate can be achieved.

Even in the case of drilling with a drill driver in which a person directly holds the drill driver in hand and conducts drilling and there exist the individual differences in the feed rate, as it is possible to reliably obtain a hole without a spiral convex part by the broad crest width of the crest of the finishing blade, the withdrawal operation can be reliably carried out while keeping its positive rotation.

By providing a configuration in which a sharp-pointed thread to be having the crest width of $P/n+\alpha$ is formed by thread grinding, and the sharp-pointed thread is formed at a position where the desired outer diameter size is obtained by grinding an outer diameter of the pointed thread and where the crest width is P/n+α, it is possible to obtain following effects.

In practice, with the crest width of P/n, there is variation due to the pitch error and the angle error. Therefore, there is a higher likelihood of occurrence of uncut parts. Further, in a case where the feed rate per rotation is non-uniform as the drilling by a manual driver having the individual differences in the feed rate, there is also a higher likelihood that an uncut part remains. Since the uncut part remains in the form of a spiral convex part in the hole surface, it leads to a problem that the drill cannot be withdrawn while keeping its positive rotation.

By having the crest width of P/n+α, it is possible to prevent the occurrence of uncut parts because of such variations. Therefore, a reliable withdrawal of the drill while keeping its positive rotation, and the hole surface with high quality can be achieved.

By forming the dent bottom of the spiral dent of the diameter-enlarging spiral thread portion in a linear shape with an inclination angle of 2°-8°, the tip outer diameter of the diameter-enlarging spiral thread portion becomes smaller. In this way, since the pilot blade provided at the tip of the diameter-enlarging spiral thread portion becomes smaller, it becomes possible to reduce the thrust force (cutting resistance) of the pilot blade and to also improve its durability.

Further, following effects are obtained by providing a configuration in which a flange portion is directly or through another member provided at a part of a shank portion where a chuck device is not chucked, a suction cover for suctioning chips discharged from an inlet of a cutting hole may be provided, the suction cover includes:
a work surface contact opening part contacting with a surface of the material to be machined (S);
a cylindrical part extending from the work surface contact opening part;
a suction port for connecting a suction device provided at the cylindrical part; and
a shank side passing part provided at a rear side of the cylindrical part, having a shape in which the shank portion and other materials can pass through and the flange part cannot pass through;
in which
by hitting the flange part at an edge of the shank side passing part, a movement to the front side is stopped, and by the work surface contact opening part which contacts with the surface of the material to be machined (S), a movement to the rear side of the suction cover 33 associated with the cutting feed is enabled.

With the cutting hole being in the non-penetrable state, due to a gas for cooling and chip discharging which is one of the types of coolant from the side-through grooves, the chips jetted from the cutting hole inlet are trapped in the suction cover, and an efficient suction process can be achieved by the suction device without allowing the chips to scatter to the outside.

Even in the moment when the cutting hole is penetrated, since the opening formed by a cutting hole outlet and the non-communication cutting portion grooves functions as a suction port for suctioning the air outside by the suction of the suction device, the chips in the side of the cutting hole outlet are suctioned along with the air outside without scattering. Therefore, it is possible to prevent the scattering of the chips at the side of the cutting hole outlet even at the moment when the cutting hole is penetrated and afterwards.

As it is clear from the above description, by using the drills of Examples 1 through 7, it becomes possible to perform the method for drilling a material to be machined by using one drill. The method includes:
a prior cutting step for forming a pilot cutting hole in a material to be machined;
a diameter-enlarging cutting step for forming a spiral convex part while cutting the pilot cutting hole so as to enlarge a diameter of the pilot cutting hole; and
a finishing cutting step for cutting the spiral convex part and finishing an opening so as to smoothen a wall surface of the opening with a flat wall;
in which the opening is formed in the material to be machined by a single drill conducting each of the steps.

INDUSTRIAL APPLICABILITY

The present invention can be used in industries which bore on materials that are hard to be cut. Example of those materials may include FRP (fiber reinforced plastic) such as, more especially, CFRP (carbon fiber reinforced plastic), BFRP (boron fiber reinforced plastic), AFRP, and KFRP (Aramid fiber reinforced plastic), aluminum die-casting, and copper die-casting and the like.

REFERENCE SIGNS LIST

A-D: First land to fourth land
AK1-DK4: Diameter-enlarging spiral threads
AF1-DF5: Finishing spiral threads
G: Gas for cooling and chip discharging
1: Drill
2: Shank portion
3: Cutting portion
4: Drill main body
5a-5d: First cutting portion groove-fourth cutting portion groove
6: Pilot blade
9: Diameter-enlarging spiral thread portion
12: Finishing spiral thread portion
14: Spiral dent
16: relief surface
17: relief surface
18: Diameter-enlarging spiral blade portion
19: Finishing spiral blade portion
20: Spiral convex part
21a, 21b: Side-through grooves
22: Chuck device
23a, 23b: Cutting portion groove communication concave part
24: Square part
25: Spot facing hole
27: Flange part
28: Work surface contacting opening part
29: Cylindrical part
30: Suction port
31: Shank side passing part 31
32: Cutting hole
33: Suction cover
34: Gas scatter-prevention cylinder
35: Cutting hole inlet
36: Cutting hole outlet
39a, 39b, 39c: Pilot blade
40a, 40b, 40c: Diameter-enlarging spiral thread portion
41a, 41b, 41c: Cutting portion 42a: Drill of configuration 1
42b: Drill of configuration 2
42b: Drill of configuration 3
43: Pilot blade
44: Cutting portion
45: Gas scatter-prevention cylinder
46: Drill
47a, 47b, 47c: Spiral dent
48: Relief
49: High-hardness film
50: Relief surface of pilot blade
51: Cutting blade of pilot blade
52: Rake surface of pilot blade
55: Pilot blade
56: Diameter-enlarging spiral thread portion
57: Finishing spiral thread portion
58: Cutting portion
59: Drill

The invention claimed is:

1. A drill comprising:
a drill main body having a shank portion at a rear side of the drill main body and a cutting portion at a front side the drill main body;
a group of lands including a first land to an n-th land formed at the cutting portion;
a group of cutting portion grooves including a first cutting portion groove to an n-th cutting portion groove, each of the cutting portion grooves being formed between two adjacent lands from the group of lands;
a pilot blade which is formed at a tip of the cutting portion and forms a pilot cutting hole in a material to be machined;
a diameter-enlarging spiral thread portion having a group of threads of a diameter-enlarging spiral thread which is formed on each of the first land to the n-th land of the group of lands so as to continuously follow the pilot blade, the diameter-enlarging spiral thread gradually forming a spiral convex part while cutting the pilot cutting hole so as to enlarge a diameter of the pilot cutting hole;
a finishing spiral thread portion having a group of threads of a finishing spiral thread which is formed on each of the first land to the n-th land of the group of lands so as to continuously follow the diameter-enlarging spiral thread portion, each of the finishing spiral thread having the same height, and cutting and finishing the spiral convex part so as to have a flat wall surface;
a spiral dent formed between a spiral thread and a spiral thread of the diameter-enlarging spiral thread and the finishing spiral thread in a way that each adjacent cutting portion groove from the group of cutting portion grooves can communicate with each other;
a diameter-enlarging spiral blade portion which is a crest edge of the diameter-enlarging spiral thread formed by the diameter-enlarging spiral thread and a groove surface of each of the first cutting portion groove to the n-th cutting portion groove of the group of cutting portion grooves and has a group of blades of a diameter-enlarging blade, the diameter-enlarging blade performing a segmented diameter-enlarging cutting or a split diameter-enlarging cutting to the pilot cutting hole formed by the pilot blade; and
a finishing spiral blade portion which is a crest edge formed by the finishing spiral thread and a groove surface of each of the first cutting portion groove to the n-th cutting portion groove of the group of cutting portion grooves and has a group of blades of a finishing blade, the finishing blade performing a segmented diameter-enlarging cutting or a split diameter-enlarging cutting to a diameter-enlarging culling hole formed by the diameter-enlarging spiral blade portion.

2. The drill according to claim 1, wherein the pilot blade does not have a margin, both of the pilot blade and the diameter-enlarging spiral thread portion do not have a margin, or any of the pilot blade, the diameter-enlarging spiral thread portion, and the finishing spiral thread portion does not have a margin.

3. The drill according to claim 1, further comprising:
a side-through groove formed at an outer peripheral of the shank portion, the side-through groove directly communicating with any of the first cutting portion groove to the n-th cutting portion groove of the group of cutting portion grooves, wherein:
the cutting portion groove communicating with the side-through groove is regarded as a communication cutting portion groove,
a coolant which is supplied from a chuck device chucking the shank portion is passed through the side-through groove, inflow-guided into the communication cutting portion groove, and supplied to the pilot blade, and
the cutting portion groove among the first cutting portion groove to the n-th cutting portion groove of the group of cutting portion grooves which does not communicate with the side-through groove is regarded as a non-communication cutting portion groove; and
a cutting portion groove communication concave part formed at a portion where the pilot blade is formed, the cutting portion groove communication concave part allowing the communication cutting portion groove to directly communicate with the non-communication cutting portion groove, wherein the coolant flowing into the communication cutting portion groove passes through the cutting portion groove communication concave part, passes into the non-communication cutting portion groove, and get discharged from an inlet of a cutting hole;
wherein a groove shape of the first cutting portion groove to the n-th cutting portion groove of the group of cutting portion grooves is a straight groove shape or a weak twisted groove shape by which the coolant from the side-through groove is supplied to the pilot blade.

4. The drill according to claim 1, wherein the first cutting portion groove to the n-th cutting portion groove of the group of cutting portion grooves are twisted in a direction where stress is not generated towards a thrust direction in machining by a lead angle of the diameter-enlarging spiral thread portion and the finishing spiral thread portion.

5. The drill according to claim 1, wherein a terminal outer diameter of the pilot blade is the same as a tip outer diameter of the diameter-enlarging spiral thread portion.

6. The drill according to claim 1, wherein:
P represents a pitch, and $\alpha$ is set at 0.01 mm-0.5 mm,
a crest width of a crest of the finishing blade at the position where a desired outer diameter size of the finishing spiral thread portion is obtained is set to $P/8+\alpha$ that is wider than $P/8$,
a sharp-pointed thread to be having the crest width of $P/8+\alpha$ is formed by thread grinding, and
the sharp-pointed thread is formed at a position where the desired outer diameter size is obtained by grinding an outer diameter of the pointed thread and where the crest width is $P/8+\alpha$.

7. The drill according to claim 1, wherein:
a pitch is set as P, and a groove number of the cutting portion groove is set as n; and
the crest width of the crest of the finishing blade at the position where a desired outer diameter size of the finishing spiral thread portion is obtained is set to P/n.

8. The drill according to claim 1, wherein:
P represents a pitch, $\alpha$ is set to 0.01 mm-0.5 mm, and a groove number of the cutting portion groove is set as n; and
the crest width of the crest of the finishing blade at the position where a desired outer diameter size of the finishing spiral thread portion is obtained is set at P/n+a.

9. The drill according to claim 1, wherein a dent bottom of the spiral dent of the diameter-enlarging spiral thread portion is formed linearly with an inclination angle of 2°-8°.

10. The drill according to claim 1, further comprising a flange portion provided directly or through another member to a part of the shank portion where a chuck device is not chucked, wherein a suction cover for suctioning chips discharged from an inlet of a cutting hole is provided or is attachable, the suction cover including:
a work surface contacting opening part contacting with a surface of the material to be machined;
a cylindrical part extending from the work surface contacting opening part;
a suction port for connecting a suction device provided at the cylindrical part; and
a shank side passing part provided at a rear side of the cylindrical part, and having a shape in which the shank portion or another member can pass through and the flange part cannot pass through, and
wherein by hitting the flange part at an edge of the shank side passing part, a movement to the front side is stopped, and by the work surface contacting opening part contacting with the surface of the material to be machined, a movement to a rear side of the suction cover associated with a cutting feed is enabled.

* * * * *